(12) United States Patent
Hashimoto et al.

(10) Patent No.: US 11,830,531 B2
(45) Date of Patent: *Nov. 28, 2023

(54) MAGNETIC RECORDING MEDIUM

(71) Applicant: Sony Group Corporation, Tokyo (JP)

(72) Inventors: Kazuya Hashimoto, Miyagi (JP); Minoru Yamaga, Miyagi (JP); Takanobu Iwama, Miyagi (JP); Jun Takahashi, Miyagi (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,343

(22) Filed: Dec. 20, 2022

(65) Prior Publication Data

US 2023/0120213 A1 Apr. 20, 2023

Related U.S. Application Data

(63) Continuation of application No. 16/651,454, filed as application No. PCT/JP2019/038781 on Oct. 1, 2019, now Pat. No. 11,538,495.

(30) Foreign Application Priority Data

Aug. 16, 2019 (JP) ................................. 2019-149511

(51) Int. Cl.
*G11B 5/73* (2006.01)
*G11B 5/17* (2006.01)
*G11B 5/78* (2006.01)

(52) U.S. Cl.
CPC ............ *G11B 5/73931* (2019.05); *G11B 5/17* (2013.01); *G11B 5/78* (2013.01)

(58) Field of Classification Search
None
See application file for complete search history.

(56) References Cited

U.S. PATENT DOCUMENTS

| 4,792,483 A | 12/1988 | Miyake et al. |
| 9,224,413 B2 | 12/2015 | Kimura et al. |

(Continued)

FOREIGN PATENT DOCUMENTS

| EP | 0492648 A2 * | 7/1992 | ............... G11B 5/64 |
| EP | 0635824 A1 * | 6/1994 | ............. G11B 5/704 |

(Continued)

OTHER PUBLICATIONS

Notice of Reasons for Refusal dated Oct. 11, 2019 in corresponding Japanese Patent Application No. 2019-149511.

(Continued)

*Primary Examiner* — William J Klimowicz
(74) *Attorney, Agent, or Firm* — K&L Gates LLP

(57) ABSTRACT

A magnetic recording medium that can exhibit good traveling performance during use is provided. This magnetic recording medium is a tape-shaped magnetic recording medium, and includes a substrate, a base layer disposed on the substrate, and a magnetic layer disposed on the base layer. The substrate includes a polyester as a main component. The average thickness of the base layer is 0.9 μm or less. The base layer and the magnetic layer each include a lubricant. The magnetic layer has a surface having a large number of holes, and the arithmetic average roughness Ra of the surface is 2.5 nm or less. The BET specific surface area of the entire magnetic recording medium is 3.5 m²/g or more in a state where the lubricant has been removed from the magnetic recording medium and the magnetic recording medium has been dried. The squareness ratio in the perpendicular direction is 65% or more. The average thickness of the magnetic layer is 90 nm or less. The average thickness of the magnetic recording medium is 5.6 μm or less.

27 Claims, 5 Drawing Sheets

(56) References Cited

U.S. PATENT DOCUMENTS

| | | | |
|---|---|---|---|
| 10,665,259 B1 | 5/2020 | Yamaga et al. | |
| 10,796,724 B1 | 10/2020 | Nakashio et al. | |
| 11,482,245 B2* | 10/2022 | Yamaga | G11B 5/73927 |
| 11,538,495 B2* | 12/2022 | Hashimoto | G11B 5/71 |
| 2006/0110627 A1 | 5/2006 | Greczyna et al. | |
| 2007/0236835 A1 | 10/2007 | Oyanagi et al. | |
| 2013/0130064 A1 | 5/2013 | Sato | |
| 2014/0272474 A1 | 9/2014 | Kasada | |
| 2017/0092314 A1 | 3/2017 | Mori | |
| 2020/0357437 A1 | 11/2020 | Yamaga et al. | |
| 2021/0241786 A1 | 8/2021 | Kasada et al. | |
| 2022/0028421 A1 | 1/2022 | Kaneko et al. | |
| 2022/0106195 A1 | 4/2022 | Matsumoto | |
| 2022/0108723 A1 | 4/2022 | Atagi et al. | |

FOREIGN PATENT DOCUMENTS

| | | |
|---|---|---|
| JP | 2000-2115433 | 8/2000 |
| JP | 2004-005891 | 1/2004 |
| JP | 2004-273070 | 9/2004 |
| JP | 2006-065953 | 3/2006 |
| JP | 2006-099919 | 4/2006 |
| JP | 2007-273036 | 10/2007 |
| JP | 2007-299513 | 11/2007 |
| JP | 2009-087468 | 4/2009 |
| JP | 2016-139451 | 8/2016 |
| JP | 2019-003712 | 1/2019 |
| JP | 6635216 | 1/2020 |
| JP | 6725050 | 7/2020 |
| JP | 6863444 | 4/2021 |
| JP | 6962482 | 11/2021 |
| JP | 7063411 B2 | 5/2022 |
| WO | 2019/159466 | 8/2019 |

OTHER PUBLICATIONS

Decision to Grant a Patent dated Nov. 13, 2019 in corresponding Japanese Patent Application No. 2019-149511.

* cited by examiner

US 11,830,531 B2

MAGNETIC RECORDING MEDIUM

TECHNICAL FIELD

The present disclosure relates to a magnetic recording medium, and a magnetic recording/reproducing device and a magnetic recording medium cartridge using the magnetic recording medium.

BACKGROUND ART

A tape-shaped magnetic recording medium is widely used for storing electronic data. For example, Patent Document 1 describes that a surface of a magnetic layer is smoothed in order to improve electromagnetic conversion characteristics of a magnetic recording medium. Furthermore, this document describes that a lubricant is added to the magnetic layer in order to suppress friction caused by contact between the magnetic recording medium and a head.

CITATION LIST

Patent Document

Patent Document 1: Japanese Patent Application Laid-Open No. 2006-65953

SUMMARY OF THE INVENTION

By the way, such a tape-shaped magnetic recording medium is required to be able to record or reproduce information stably during recording or reproduction.

Therefore, a magnetic recording medium that can exhibit good traveling performance during use is desired.

A magnetic recording medium according to an embodiment of the present disclosure is a tape-shaped magnetic recording medium, and includes a substrate, a base layer disposed on the substrate, and a magnetic layer disposed on the base layer. The substrate includes a polyester as a main component. The average thickness of the base layer is 0.9 µm or less. The base layer and the magnetic layer each include a lubricant. The magnetic layer has a surface having a large number of holes, and the arithmetic average roughness Ra of the surface is 2.5 nm or less. The BET specific surface area of the entire magnetic recording medium is 3.5 m$^2$/g or more in a state where the lubricant has been removed from the magnetic recording medium and the magnetic recording medium has been dried. The squareness ratio in the perpendicular direction is 65% or more. The average thickness of the magnetic layer is 90 nm or less. The average thickness of the magnetic recording medium is 5.6 µm or less.

A magnetic recording/reproducing device according to an embodiment of the present disclosure includes a feeding device that can sequentially feed out the magnetic recording medium described above (the magnetic recording medium by rotating a roll of the magnetic recording medium), a winding device that can wind up the magnetic recording medium fed out from the feeding device, and a magnetic head that can write information on the magnetic recording medium and can read out information from the magnetic recording medium while being in contact with the magnetic recording medium traveling from the feeding device toward the winding device.

In the magnetic recording medium and the magnetic recording/reproducing device according to an embodiment of the present disclosure, since the base layer is relatively thin, material cost is reduced, and improvement in the winding amount per cartridge is expected. Furthermore, since the entire magnetic recording medium has a BET specific surface area of 3.5 m$^2$/g or more, the lubricant is stably supplied to a surface of the magnetic recording medium even in a case where the base layer is thinned.

MODE FOR CARRYING OUT THE INVENTION

Hereinafter, an embodiment of the present disclosure will be described in detail with reference to the drawings. Note that the description will be made in the following order.

1. One embodiment
1-1. Configuration of magnetic recording medium
1-2. Method for manufacturing magnetic recording medium
1-3. Configuration of recording/reproducing device
1-4. Effect
2. Modification <1. One Embodiment>

[1-1 Configuration of Magnetic Recording Medium 10]

Figure 1:
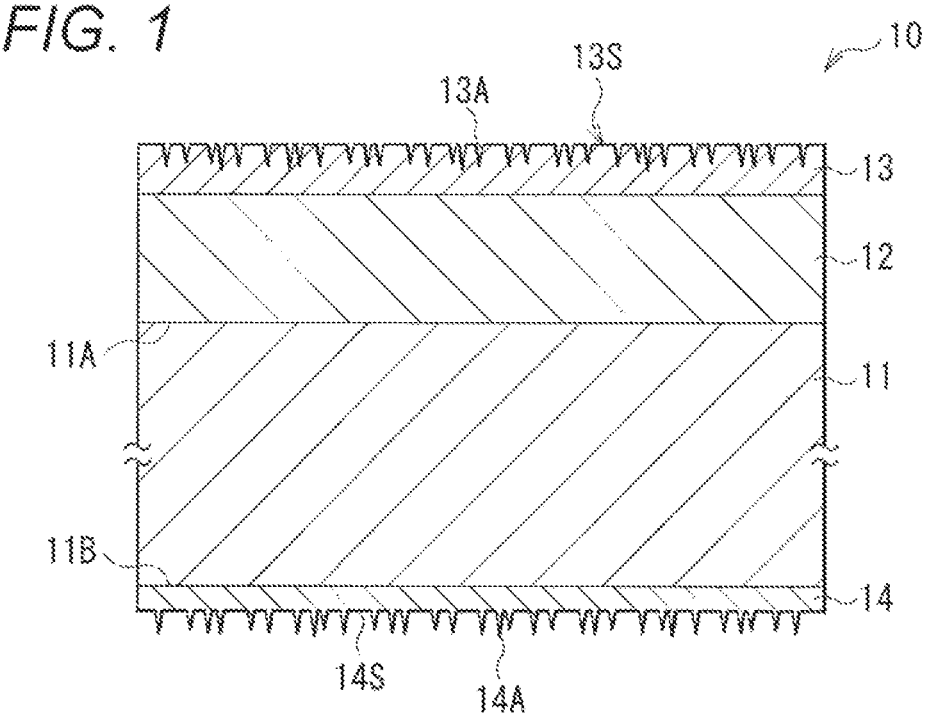
FIG. 1 is a cross-sectional view of a magnetic recording medium according to an embodiment of the present disclosure.

FIG. 1 illustrates a cross-sectional configuration example of a magnetic recording medium 10 according to an embodiment of the present disclosure. As illustrated in FIG. 1, the magnetic recording medium 10 has a laminated structure in which a plurality of layers is laminated. Specifically, the magnetic recording medium 10 includes a long tape-shaped substrate 11, a base layer 12 disposed on one main surface 11A of the substrate 11, a magnetic layer 13 disposed on the base layer 12, and a back layer 14 disposed on the other main surface 11B of the substrate 11. A surface 13S of the magnetic layer 13 is a surface on which a magnetic head travels while being in contact with the surface 13S. Note that the base layer 12 and the back layer 14 are disposed as necessary and may be omitted. Note that the average thickness of the magnetic recording medium 10 is preferably 5.6 µm or less, for example. Furthermore, the magnetic recording medium 10 preferably has Young's modulus of 7.78 GPa or less, for example.

Figure 7:
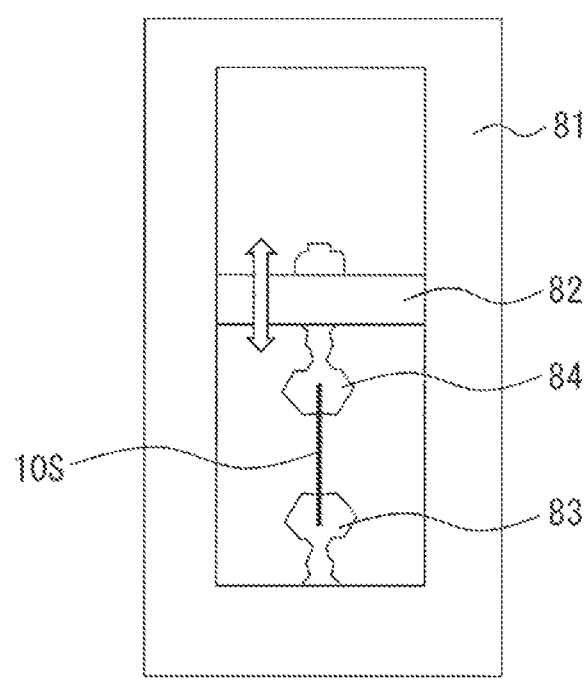
FIG. 7 is a schematic diagram illustrating a tensile tester.

The Young's modulus of the magnetic recording medium 10 is measured by, for example, a tensile tester. For example, as illustrated in FIG. 7, the tensile tester includes a main body 81, a movable portion 82 that can move up and down in the vertical direction with respect to the main body 81, a gripping jig 83 attached to the main body 81, and a gripping jig 84 attached to the movable portion 82. The gripping jigs 83 and 84 are jigs for respectively gripping ends of a measurement sample 10S cut out from the magnetic recording medium 10. As the tensile tester, for example, "AG-100D" manufactured by Shimadzu Corporation can be used.

In a case where it is desired to measure the Young's modulus of the magnetic recording medium 10 in a longitudinal direction thereof using the tensile tester illustrated in FIG. 7, first, the magnetic recording medium 10 is cut into a length of 180 mm to prepare the measurement sample 10S. Next, the gripping jigs 83 and 84 that can fix the measurement sample 10S over the entire width (for example, ½ inches) are attached to the main body 81 and the movable portion 82 in the tensile tester described above, respectively. Thereafter, both ends of the measurement sample 10S in a longitudinal direction thereof are fixed by the gripping jigs 83 and 84, respectively. At this time, an interval between the gripping jigs 83 and 84 is set to 100 mm. Thereafter, the interval between the gripping jigs 83 and 84 is increased in the longitudinal direction of the measurement sample 10S at a pulling speed of 0.1 mm/min, and a stress is applied to the measurement sample 10S. The Young's modulus can be calculated using the following formula on the basis of a change in stress and the amount of elongation at this time.

$$E=\{(\Delta N/S)/(\Delta X/L)\}\times 10^6 [N/m^2]$$

In this formula,
$\Delta N$: Change in stress [N]
S: Cross-sectional area of measurement sample 10S [mm$^2$]
$\Delta X$: Amount of elongation [mm]
L: Interval between gripping jigs [mm]

A range of the stress is set to 0.5 N to 1.0 N, and a change in stress ($\Delta N$) and the amount of elongation ($\Delta X$) at this time are used in the calculation.

The magnetic recording medium 10 has a long tape shape, and travels in its own longitudinal direction during recording and reproducing operations. The magnetic recording medium 10 is preferably used for a recording/reproducing device including a ring type head as a recording head, for example.

(Substrate 11)

The substrate 11 is a nonmagnetic support for supporting the base layer 12 and the magnetic layer 13. The substrate 11 has a long film shape. An upper limit value of the average thickness of the substrate 11 is preferably 4.2 μm or less, and more preferably 4.0 μm or less. When the upper limit value of the average thickness of the substrate 11 is 4.2 μm or less, the recording capacity that can be recorded in one data cartridge can be increased as compared to a general magnetic recording medium. A lower limit value of the average thickness of the substrate 11 is preferably 3 μm or more, and more preferably 3.2 μm or more. When the lower limit value of the average thickness of the substrate 11 is 3 μm or more, a decrease in strength of the substrate 11 can be suppressed.

The average thickness of the substrate 11 is determined as follows. First, the magnetic recording medium 10 having a width of ½ inches is prepared and cut into a length of 250 mm to manufacture a sample. Subsequently, layers of the sample other than the substrate 11, that is, the base layer 12, the magnetic layer 13, and the back layer 14 are removed with a solvent such as methyl ethyl ketone (MEK) or dilute hydrochloric acid. Next, the thickness of the substrate 11 as a sample is measured at five or more points using a laser hologage (LGH-110C) manufactured by Mitsutoyo Corporation as a measuring device, and the measured values are simply averaged (arithmetically averaged) to calculate the average thickness of the substrate 11. Note that the measurement points are randomly selected from the sample.

The substrate 11 includes, for example, a polyester as a main component. The substrate 11 may include at least one of a polyolefin, a cellulose derivative, a vinyl-based resin, and another polymer resin in addition to a polyester. In a case where the substrate 11 includes two or more of the materials described above, the two or more materials may be mixed, copolymerized, or laminated.

The polyester included in the substrate 11 includes, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate.

The polyolefin included in the substrate 11 includes, for example, at least one of polyethylene (PE) and polypropylene (PP). The cellulose derivative includes, for example, at least one of cellulose diacetate, cellulose triacetate, cellulose acetate butyrate (CAB), and cellulose acetate propionate (CAP). The vinyl-based resin includes, for example, at least one of polyvinyl chloride (PVC) and polyvinylidene chloride (PVDC).

The other polymer resin included in the substrate 11 includes, for example, at least one of polyamide or nylon (PA), aromatic polyamide or aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ester, polyether sulfone (PES), polyether imide (PEI), polysulfone (PSF), polyphenylene sulfide (PPS), polycarbonate (PC), polyarylate (PAR), and polyurethane (PU).

(Magnetic Layer 13)

The magnetic layer 13 is a recording layer for recording a signal. The magnetic layer 13 includes, for example, magnetic powder, a binder, and a lubricant. The magnetic layer 13 may further include an additive such as conductive particles, an abrasive, or a rust inhibitor as necessary.

The magnetic layer 13 has a surface 13S having a large number of holes 13A. The large number of holes 13A store a lubricant. The large number of holes 13A preferably extend in a direction perpendicular to a surface of the magnetic layer 13. This is because a property of supplying the lubricant to the surface 13S of the magnetic layer 13 can be improved. Note that some of the large number of holes 13A may extend in the perpendicular direction.

The arithmetic average roughness Ra of the surface 13S of the magnetic layer 13 is 2.5 nm or less, preferably 2.2 nm or less, and more preferably 1.9 nm or less. When the arithmetic average roughness Ra is 2.5 nm or less, excellent electromagnetic conversion characteristics can be obtained. A lower limit value of the arithmetic average roughness Ra of the surface 13S of the magnetic layer 13 is preferably 0.8 nm or more, and more preferably 1.0 nm or more. When the lower limit value of the arithmetic average roughness Ra of the surface 13S of the magnetic layer 13 is 0.8 nm or more, it is possible to suppress a decrease in traveling performance due to an increase in friction.

The arithmetic average roughness Ra of the surface 13S is determined as follows. First, a surface of the magnetic layer 13 is observed with an atomic force microscope (AFM) to obtain an AFM image of 40 μm×40 μm. As the AFM, Nano Scope Ma D3100 manufactured by Digital Instruments is used. A cantilever including a silicon single crystal is used. Measurement is performed by tuning at 200 Hz to 400 Hz as a tapping frequency. As the cantilever, for example, "SPM probe NCH normal type Point Probe L (cantilever length)=125 μm" manufactured by Nano World can be used. Next, an AFM image is divided into 512×512 (=262,144) measurement points. The height $Z(i)$ (i: measurement point number, i=1 to 262,144) is measured at each measurement point. The measured heights $Z(i)$ at the measurement points are simply averaged (arithmetically averaged) to determine average height (average plane) Zave ($=Z(1)+Z(2)+ \ldots +Z(262,144))/262,144$). Subsequently, a deviation $Z''(i)$ ($=|Z(i)-Zave|$) from an average center line at each measurement point is determined, and the arithmetic average roughness Ra [nm] ($=(Z''(1)+Z''(2)+ \ldots +Z''(262,144))/262,144$) is calculated. In this case, as image processing, data that has been subjected to filtering processing by Flatten order 2 and plane fit order 3 XY is used as data.

A lower limit value of the BET specific surface area of the entire magnetic recording medium 10 in a state where the lubricant has been removed from the magnetic recording medium and the magnetic recording medium has been dried is 3.5 m$^2$/g or more, preferably 4.0 m$^2$/g or more, more preferably 4.5 m$^2$/g or more, and still more preferably 5.0 m$^2$/g or more. When the lower limit value of the BET specific surface area is 3.5 m$^2$/g or more, even after recording or reproduction is performed repeatedly (that is, even after the magnetic recording medium 10 repeatedly travels while a magnetic head is in contact with a surface of the magnetic recording medium 10), it is possible to suppress a decrease in the amount of a lubricant supplied to a space between a surface of the magnetic layer 13 and the magnetic head. Therefore, an increase in the coefficient of dynamic friction can be suppressed.

An upper limit value of the BET specific surface area of the entire magnetic recording medium 10 in a state where the lubricant has been removed from the magnetic recording medium and the magnetic recording medium has been dried is preferably 7.0 m$^2$/g or less, more preferably 6.0 m$^2$/g or less, and still more preferably 5.5 m$^2$/g or less. When the upper limit value of the BET specific surface area is 7.0 m$^2$/g or less, a lubricant can be sufficiently supplied without being depleted even after traveling many times. Therefore, an increase in the coefficient of dynamic friction can be suppressed.

The magnetic recording medium 10 in a state where the lubricant has been removed from the magnetic recording medium 10 and the magnetic recording medium 10 has been dried here refers to the magnetic recording medium 10 obtained by immersing the magnetic recording medium 10 in hexane at room temperature for 24 hours, then taking the magnetic recording medium 10 out of hexane, and naturally drying the magnetic recording medium 10.

An average pore diameter of the entire magnetic recording medium 10 determined by a BJH method is 6 nm or more and 12 nm or less, preferably 7 nm or more and 10 nm or less, and more preferably 7.5 nm or more and 10 nm or less. When the average pore diameter is 6 nm or more and 12 nm or less, the above-described effect of suppressing the increase in the coefficient of dynamic friction can be further improved.

The BET specific surface area and a pore distribution (pore volume and pore diameter of maximum pore volume at the time of desorption) are determined as follows. First, the magnetic recording medium 10 having a size about 10% larger than the area 0.1265 m$^2$ is immersed in hexane (amount in which the tape can be sufficiently immersed, for example, 150 mL) for 24 hours, then naturally dried, and cut out so as to have an area of 0.1265 m$^2$ (for example, 50 cm at each end of the dried tape is cut off to prepare a tape having a width of 10 m) to manufacture a measurement sample. Next, using a specific surface area/pore distribution measuring device, a pore distribution (pore volume and average pore diameter) is determined by a BJH method. A measuring device and measuring conditions are indicated below. In this way, the average diameter of the pores is measured.

Measurement environment: room temperature
Measuring device: 3 FLEX manufactured by Micromeritics Instrument Corp.
Measurement adsorbate: N$_2$ gas
Measurement pressure range (P/PO): 0 to 0.995

For the measurement pressure range, the pressure is changed as illustrated in Table below. The pressure values in Table below are relative pressures P/PO. In Table below, for example, in step 1, the pressure is changed so as to change by 0.001 per 10 seconds from a starting pressure 0.000 to an ultimate pressure 0.010. When the pressure reaches the ultimate pressure, pressure change in the next step is performed. This also applies to steps 2 to 10. However, in each step, in a case where the pressure has not reached equilibrium, the device waits for the pressure to reach equilibrium and then proceeds to the next step.

TABLE 1

| Step | Starting pressure | Pressure change | Ultimate pressure |
|---|---|---|---|
| 1 | 0.000 | 0.001/10 sec | 0.010 |
| 2 | 0.010 | 0.02/10 sec | 0.100 |
| 3 | 0.100 | 0.05/10 sec | 0.600 |
| 4 | 0.600 | 0.05/10 sec | 0.950 |
| 5 | 0.950 | 0.05/10 sec | 0.990 |
| 6 | 0.990 | 0.05/10 sec | 0.995 |
| 7 | 0.995 | 0.01/10 sec | 0.990 |
| 8 | 0.990 | 0.01/10 sec | 0.950 |
| 9 | 0.950 | 0.05/10 sec | 0.600 |
| 10 | 0.600 | 0.05/10 sec | 0.300 |

Figure 2A:
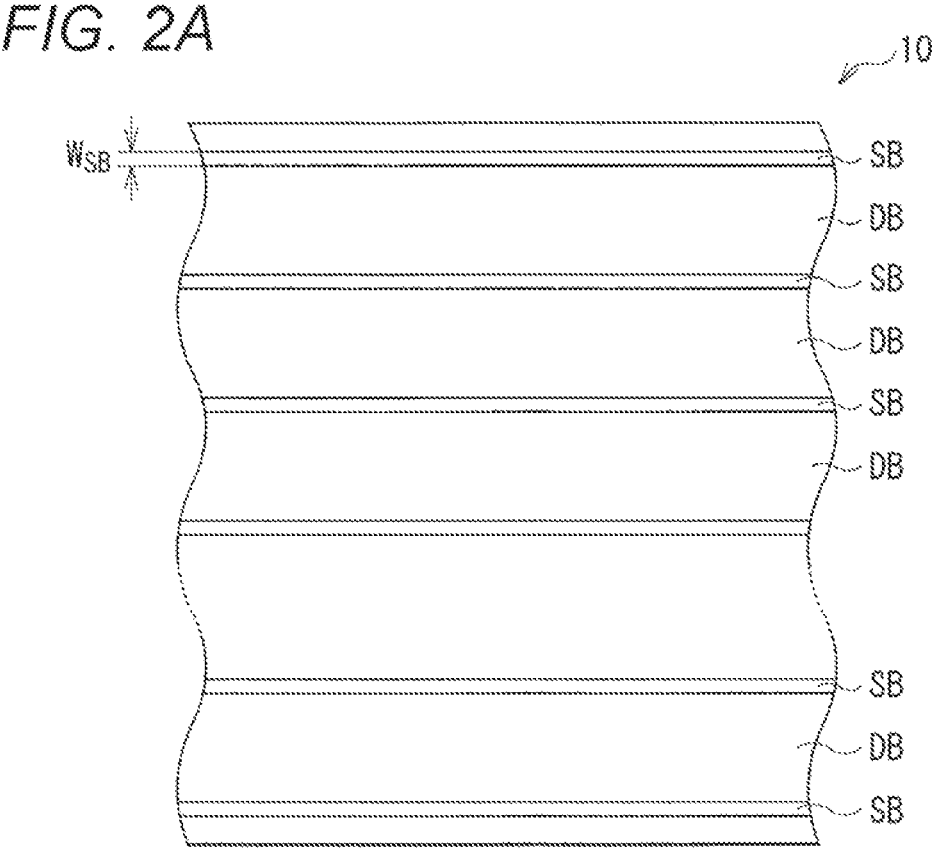
FIG. 2A is a schematic explanatory diagram illustrating a layout of data bands and servo bands in the magnetic recording medium illustrated in FIG. 1.

For example, as illustrated in FIG. 2A, the magnetic layer 13 preferably has a plurality of servo bands SB and a plurality of data bands DB in advance. FIG. 2A is a schematic explanatory diagram illustrating a layout of the data band DB and the servo band SB in the magnetic recording medium 10, and illustrates a layout in a plane orthogonal to a lamination direction in the magnetic recording medium 10 having a laminated structure. As illustrated in FIG. 2A, the plurality of servo bands SB is disposed at equal intervals in the width direction of the magnetic recording medium 10. The width direction of the magnetic recording medium 10 is a direction orthogonal to both a longitudinal direction of the magnetic recording medium 10 and the lamination direction thereof. A data band DB is disposed between adjacent servo bands SB in the width direction. In the servo band SB, a servo signal for performing tracking control of a magnetic head is written in advance. User data is recorded in the data band DB.

An upper limit value of a ratio $R_S$ ($=(S_{SB}/S)\times100$) of a total area $S_{SB}$ of the servo bands SB with respect to an area S of the surface 13S of the magnetic layer 13 is preferably 4.0% or less, more preferably 3.0% or less, and still more preferably 2.0% or less from a viewpoint of securing a high recording capacity. Meanwhile, a lower limit value of the ratio $R_S$ of the total area $S_{SB}$ of the servo bands SB with respect to the area S of the surface of the magnetic layer 13 is preferably 0.8% or more from a viewpoint of securing five or more servo tracks.

The ratio $R_S$ of the total area $S_{SB}$ of the servo bands SB with respect to the area S of the surface of the magnetic layer 13 can be measured, for example, by developing the magnetic recording medium 10 using a ferricolloid developer (Sigmarker Q manufactured by Sigma Hi-Chemical Inc.) and then observing the developed magnetic recording medium 10 with an optical microscope. The servo band width $W_{SB}$ and the number of servo bands SB are measured from the observation image of the optical microscope. Next, the ratio $R_S$ is determined from the following formula.

Ratio $R_S[\%]$=(((servo bandwidth $W_{SB}$)×(number of servo bands))/(width of magnetic recording medium 10))×100

The number of servo bands SB is preferably 5 or more, and more preferably 5+4n (in which n is a positive integer) or more. When the number of servo bands SB is 5 or more, an influence on a servo signal due to a dimensional change of the magnetic recording medium 10 in a width direction thereof can be suppressed, and stable recording/reproducing characteristics with less off-track can be secured.

An upper limit value of the servo bandwidth $W_{SB}$ is preferably 95 µm or less, more preferably 60 µm or less, and still more preferably 30 µm or less from a viewpoint of securing a high recording capacity. A lower limit value of the servo bandwidth $W_{SB}$ is preferably 10 µm or more from a viewpoint of manufacturing a recording head. The width of the servo bandwidth $W_{SB}$ can be determined as follows. First, the magnetic recording medium 10 is developed using a ferricolloid developer (Sigmarker Q manufactured by Sigma Hi-Chemical Inc.). Next, the developed magnetic recording medium 10 is observed with an optical microscope, and the width of the servo bandwidth $W_{SB}$ can be thereby measured.

Figure 2B:
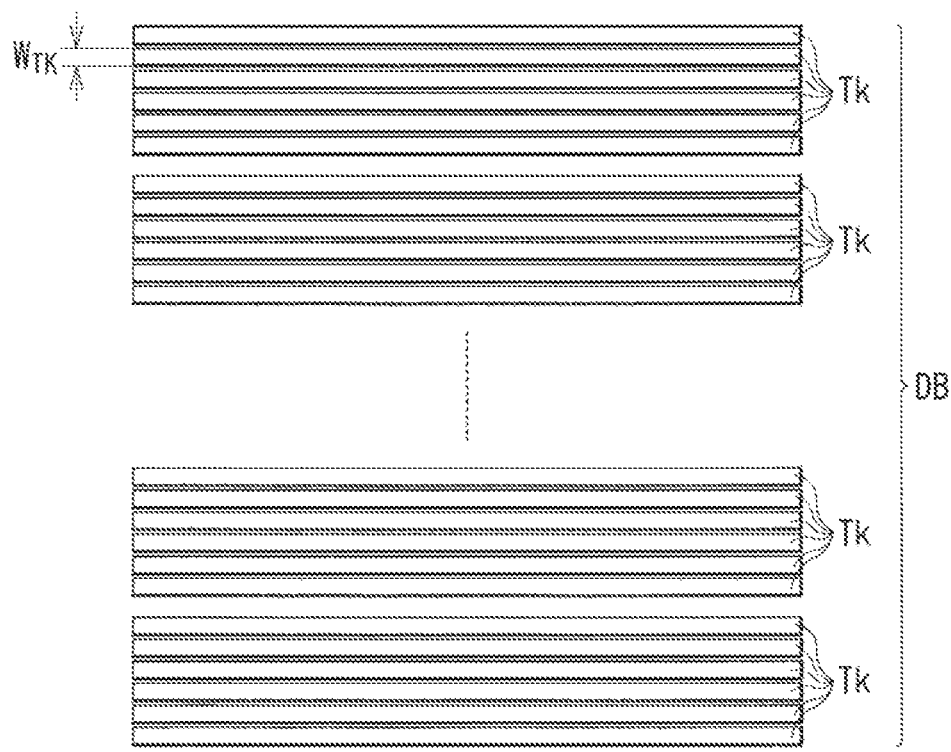
FIG. 2B is a schematic explanatory diagram illustrating the data band illustrated in FIG. 2A in an enlarged manner.

As illustrated in FIG. 2B, the magnetic layer 13 can form a plurality of data tracks Tk in a data band DB. In this case, an upper limit value of the data track width $W_{Tk}$ is preferably 2.0 µm or less, more preferably 1.5 µm or less, and still more preferably 1.0 µm or less from a viewpoint of securing a high recording capacity. A lower limit value of the data track width $W_{Tk}$ is preferably 0.02 µm or more from a viewpoint of a magnetic particle size.

The magnetic layer 13 can record data such that the minimum value of a distance L between magnetization inversions is preferably 48 nm or less, more preferably 44 nm or less, and still more preferably 40 nm or less from a viewpoint of securing a high recording capacity. The lower limit value of the minimum value of the distance L between magnetization inversions is considered from a viewpoint of a magnetic particle size.

An upper limit value of the average thickness of the magnetic layer 13 is preferably 90 nm or less, particularly preferably 80 nm or less, more preferably 70 nm or less, and still more preferably 50 nm or less. When the upper limit value of the average thickness of the magnetic layer 13 is 90 nm or less, in a case where a ring type head is used as a recording head, self-demagnetization loss, thickness loss, and the like can be reduced, and therefore electromagnetic conversion characteristics can be improved.

A lower limit value of the average thickness of the magnetic layer 13 is preferably 35 nm or more. When the upper limit value of the average thickness of the magnetic layer 13 is 35 nm or more, output can be secured in a case where an MR type head is used as a reproducing head, and therefore electromagnetic conversion characteristics can be improved.

The average thickness of the magnetic layer 13 can be determined as follows. First, a carbon film is formed on the surface 13S of the magnetic layer 13 of the magnetic recording medium 10 and on a surface 14S of the back layer 14 thereof by a vapor deposition method. Thereafter, a tungsten thin film is further formed on the carbon film covering the surface 13S of the magnetic layer 13 by a vapor deposition method. The carbon film and tungsten film protect a sample in a thinning process described later.

Next, the magnetic recording medium 10 is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface of the magnetic recording medium 10 and the back layer side surface thereof by a vapor deposition method, and the tungsten thin film is further formed on the magnetic layer side surface by a vapor deposition method or a sputtering method. The thinning is performed in a length direction (longitudinal direction) of the magnetic recording medium 10. That is, by the thinning, a cross section parallel to both the longitudinal direction of the magnetic recording medium 10 and the thickness direction thereof is formed. The cross section of the obtained thinned sample is observed with a transmission electron microscope (TEM) under the following conditions to obtain a TEM image. Note that the magnification and the acceleration voltage may be appropriately adjusted depending on the type of a device.

Device: TEM (H9000NAR manufactured by Hitachi, Ltd.)
Acceleration voltage: 300 kV
Magnification: 100,000 times Next, using the obtained TEM image, the thickness of the magnetic layer 13 is measured at ten or points in the longitudinal direction of the magnetic recording medium 10. An average value obtained by simply averaging (arithmetically averaging) the obtained measured values is taken as the average thickness of the magnetic layer 13. Note that the measurement points are randomly selected from a test piece.

(Magnetic Powder)

The magnetic powder includes, for example, powder of a nanoparticle including E iron oxide (hereinafter referred to as "E iron oxide particle"). The E iron oxide particle can obtain high coercive force even if the E iron oxide particle is a fine particle. E iron oxide included in the iron oxide particle is preferably crystal-oriented preferentially in a thickness direction (perpendicular direction) of the magnetic recording medium 10.

Figure 3:
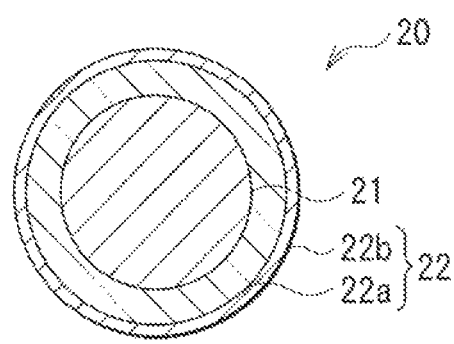
FIG. 3 is a cross-sectional view schematically illustrating a cross-sectional structure of an ε-iron oxide particle included in the magnetic layer illustrated in FIG. 1.

FIG. 3 is a cross-sectional view schematically illustrating an example of a cross-sectional structure of an E iron oxide particle 20 included in the magnetic layer 13. As illustrated in FIG. 3, the ε iron oxide particle 20 has a spherical shape or a substantially spherical shape, or have a cubic shape or a substantially cubic shape. Since the ε iron oxide particle 20 has the shape as described above, in a case where the ε iron oxide particle 20 is used as a magnetic particle, a contact area between the particles in the thickness direction of the magnetic recording medium 10 can be reduced, and aggregation of the particles can be suppressed as compared to a case where a hexagonal plate-shaped barium ferrite particle is used as the magnetic particle. Therefore, dispersibility of the magnetic powder can be enhanced, and a better signal-to-noise ratio (SNR) can be obtained.

The ε iron oxide particle 20 may have, for example, a core-shell type structure. Specifically, as illustrated in FIG. 3, the ε iron oxide particle 20 has a core portion 21 and a two-layered shell portion 22 disposed around the core portion 21. The two-layered shell portion 22 includes a first shell portion 22a disposed on the core portion 21 and a second shell portion 22b disposed on the first shell portion 22a.

The core portion 21 in the ε iron oxide particle 20 includes ε iron oxide. ε iron oxide included in the core portion 21 preferably includes an ε-$Fe_2O_3$ crystal as a main phase, and more preferably includes ε-$Fe_2O_3$ as a single phase.

The first shell portion 22a covers at least a part of the periphery of the core portion 21. Specifically, the first shell portion 22a may partially cover the periphery of the core portion 21 or may cover the entire periphery of the core portion 21. The first shell portion 22a preferably covers the entire surface of the core portion 21 from a viewpoint of making exchange coupling between the core portion 21 and the first shell portion 22a sufficient and improving magnetic characteristics.

The first shell portion 22a is a so-called soft magnetic layer, and includes, for example, a soft magnetic material such as α-Fe, a Ni—Fe alloy, or a Fe—Si—Al alloy. α-Fe may be obtained by reducing ε iron oxide included in the core portion 21.

The second shell portion 22b is an oxide film as an antioxidant layer. The second shell portion 22b includes a iron oxide, aluminum oxide, or silicon oxide. α-iron oxide includes, for example, at least one iron oxide of $Fe_3O_4$, $Fe_2O_3$, and FeO. In a case where the first shell portion 22a includes α-Fe (soft magnetic material), α-iron oxide may be obtained by oxidizing α-Fe included in the first shell portion 22a.

By inclusion of the first shell portion 22a in the ε iron oxide particle 20 as described above, a coercive force Hc of the entire ε iron oxide particle (core-shell particle) 20 can be adjusted to a coercive force Hc suitable for recording while a coercive force Hc of the core portion 21 alone is maintained at a large value in order to secure thermal stability. Furthermore, by inclusion of the second shell portion 22b in the ε iron oxide particle 20 as described above, it is possible to suppress deterioration of the characteristics of the ε iron oxide particle 20 due to generation of a rust and the like on a surface of the particle by exposure of the ε iron oxide particle 20 to the air during a step of manufacturing the magnetic recording medium 10 and before the step. Therefore, characteristic deterioration of the magnetic recording medium 10 can be suppressed by covering the first shell portion 22a with the second shell portion 22b.

The average particle size (average maximum particle size) of the magnetic powder is preferably 25 nm or less, more preferably 8 nm or more and 22 nm or less, and still more preferably 12 nm or more and 22 nm or less. In the magnetic recording medium 10, an area having a half size of a recording wavelength is an actual magnetization area. Therefore, by setting the average particle size of the magnetic powder to a half or less of the shortest recording wavelength, a good S/N can be obtained. Therefore, when the average particle size of the magnetic powder is 22 nm or less, in the magnetic recording medium 10 having a high recording density (for example, the magnetic recording medium 10 that can record a signal at the shortest recording wavelength of 50 nm or less), good electromagnetic conversion characteristics (for example, SNR) can be obtained. Meanwhile, when the average particle size of the magnetic powder is 8 nm or more, dispersibility of the magnetic powder is further improved, and better electromagnetic conversion characteristics (for example, SNR) can be obtained.

The magnetic powder has an average aspect ratio of preferably 1 or more and 3.0 or less, more preferably 1 or more and 2.8 or less, still more preferably 1 or more and 1.8 or less. When the average aspect ratio of the magnetic powder is within a range of 1 or more and 3.0 or less, aggregation of the magnetic powder can be suppressed, and resistance applied to the magnetic powder can be suppressed when the magnetic powder is vertically oriented in a step of forming the magnetic layer 13. Therefore, perpendicular orientation of the magnetic powder can be improved.

The average particle size and the average aspect ratio of the magnetic powder described above can be determined as follows. First, the magnetic recording medium 10 to be measured is processed to be thinned by a focused ion beam (FIB) method and the like. Thinning is performed in the length direction (longitudinal direction) of the magnetic tape. That is, this thinning forms a cross section parallel to both the longitudinal direction of the magnetic recording medium 10 and the thickness direction thereof. Cross-sectional observation is performed for the obtained thin sample such that the entire magnetic layer 13 is included with respect to the thickness direction of the magnetic layer 13 using a transmission electron microscope (H-9500 manufactured by Hitachi High-Technologies) with an acceleration voltage of 200 kV and an overall magnification of 500,000 times, and a TEM photograph is imaged. Next, 50 particles are randomly selected from the imaged TEM photograph, and a long axis length DL and a short axis length DS of each of the particles are measured. Here, the long axis length DL means the largest distance among distances between two parallel lines drawn from all angles so as to come into contact with an outline of each of the particles (so-called maximum Feret diameter). Meanwhile, the short axis length DS means the largest length among the lengths of a particle in a direction orthogonal to the long axis length DL of the particle.

Subsequently, the measured long axis lengths DL of the 50 particles are simply averaged (arithmetically averaged) to determine an average long axis length DLave. The average long axis length DLave determined in this manner is taken as an average particle size of the magnetic powder. Furthermore, the measured short axis lengths DS of the 50 particles are simply averaged (arithmetically averaged) to determine an average short axis length DSave. Then, an average aspect ratio (DLave/DSave) of the particle is determined from the average long axis length DLave and the average short axis length DSave.

The average particle volume of the magnetic powder is preferably 5500 $nm^3$ or less, more preferably 270 $nm^3$ or more and 5500 $nm^3$ or less, and still more preferably 900 $nm^3$ or more and 5500 $nm^3$ or less. When the average particle volume of the magnetic powder is 5500 $nm^3$ or less, a similar effect to that in a case where the average particle size of the magnetic powder is 22 nm or less can be obtained. Meanwhile, when the average particle volume of the magnetic powder is 270 $nm^3$ or more, a similar effect to a case where the average particle size of the magnetic powder is 8 nm or more can be obtained.

In a case where the ε iron oxide particle 20 has a spherical shape or a substantially spherical shape, the average particle volume of the magnetic powder is determined as follows. First, an average long axis length DLave is determined in a similar manner to the above-described method for calculating the average particle size of the magnetic powder. Next, an average volume V of the magnetic powder is determined by the following formula.

$$V=(\pi/6)\times(DLave)^3$$

(Binder)

As the binder, a resin having a structure in which a crosslinking reaction is imparted to a polyurethane-based resin, a vinyl chloride-based resin, and the like is preferable. However, the binder is not limited to these resins, and other resins may be blended appropriately according to physical properties and the like required for the magnetic recording medium 10. Usually, a resin to be blended is not particularly limited as long as being generally used in the application type magnetic recording medium 10.

Examples of the resin to be blended include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacryate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, a synthetic rubber, and the like.

Furthermore, examples of a thermosetting resin or a reactive resin include a phenol resin, an epoxy resin, a urea resin, a melamine resin, an alkyd resin, a silicone resin, a polyamine resin, and a urea formaldehyde resin.

Furthermore, in order to improve dispersibility of the magnetic powder, a polar functional group such as $-SO_3M$, $-OSO_3M$, $-COOM$, or $P=O(OM)_2$ may be introduced into each of the above-described binders. Here, in the chemical formulas described above, M represents a hydrogen atom or an alkali metal such as lithium, potassium, or sodium.

Moreover, examples of the polar functional group include a side chain type group having a terminal group of $-NR1R2$ or $-NR1R2R3^+X^-$, and a main chain type group of $>NR1R2^+X^-$. Here, in the formulas described above, R1, R2, and R3 each represent a hydrogen atom or a hydrocarbon group, and $X^-$ represents an ion of a halogen element such as fluorine, chlorine, bromine, or iodine, or an inorganic or organic ion. Furthermore, examples of the polar functional group include $-OH$, $-SH$, $-CN$, and an epoxy group.

(Lubricant)

The lubricant included in the magnetic layer 13 includes, for example, a fatty acid and a fatty acid ester. The fatty acid included in the lubricant preferably includes, for example, at least one of a compound represented by the following general formula <1> and a compound represented by the general formula <2>. Furthermore, the fatty acid ester included in the lubricant preferably includes at least one of a compound represented by the following general formula <3> and a compound represented by the general formula <4>. By inclusion of two compounds of a compound represented by general formula <1> and a compound represented by general formula <3>, inclusion of two compounds of a compound represented by general formula <2> and a compound represented by general formula <3>, inclusion of two compounds of a compound represented by general formula <1> and a compound represented by general formula <4>, inclusion of two compounds of a compound represented by general formula <2> and a compound represented by general formula <4>, inclusion of three compounds of a compound represented by general formula <1>, a compound represented by general formula <2>, and a compound represented by general formula <3>, inclusion of three compounds of a compound represented by general formula <1>, a compound represented by general formula <2>, and a compound represented by general formula <4>, inclusion of three compounds of a compound represented by general formula <1>, a compound represented by general formula <3>, and a compound represented by general formula <4>, inclusion of three compounds of a compound represented by general formula <2>, a compound represented by general formula <3>, and a compound represented by general formula <4>, or inclusion of four compounds of a compound represented by general formula <1>, a compound represented by general formula <2>, a compound represented by general formula <3>, and a compound represented by general formula <4> in the lubricant, an increase in the coefficient of dynamic friction due to repeated recording or reproduction in the magnetic recording medium 10 can be suppressed. As a result, traveling performance of the magnetic recording medium 10 can be further improved.

$$CH_3(CH_2)_nCOOH \qquad <1>$$

(Provided that in the general formula <1>, n is an integer selected from a range of 14 or more and 22 or less.)

$$CH_3(CH_2)_pCOO(CH_2)_qCH_3 \qquad <2>$$

(Provided that in the general formula <2>, p is an integer selected from a range of 14 or more and 22 or less, and q is an integer selected from a range of 2 or more and 5 or less.)

$$CH_3(CH_2)_nCH=CH(CH_2)_mCOOH \qquad <3>$$

(Provided that in the general formula <1>, n+m is an integer selected from a range of 12 or more and 20 or less.)

$$CH_3(CH_2)_pCOO-(CH_2)_qCH(CH_3)_2 \qquad <4>$$

(Provided that in the general formula <2>, p is an integer selected from a range of 14 or more and 22 or less, and q is an integer selected from a range of 1 or more and 3 or less.)

(Additive)

As nonmagnetic reinforcing particles, the magnetic layer 13 may further include aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Base Layer 12)

The base layer 12 is a nonmagnetic layer including nonmagnetic powder and a binder. The base layer 12 may further include at least one additive selected from a lubricant, conductive particles, a curing agent, a rust inhibitor, and the like as necessary. Furthermore, the base layer 12 may have a multi-layered structure formed by laminating a plurality of layers. An average thickness of the base layer 12 is preferably 0.5 μm or more and 0.9 μm or less, and more preferably 0.6 μm or more and 0.7 μm or less. By reducing the average thickness of the base layer 12 to 0.9 μm or less, the Young's modulus of the entire magnetic recording medium 10 is more effectively reduced than that in a case where the thickness of the substrate 11 is reduced. For this reason, tension control with respect to the magnetic recording medium 10 is easy. Furthermore, by setting the average thickness of the base layer 12 to 0.5 μm or more, adhesive force between the substrate 11 and the base layer 12 is secured. In addition, variations in the thickness of the base layer 12 can be suppressed, and an increase in the roughness of the surface 13S of the magnetic layer 13 can be prevented.

Note that the average thickness of the base layer 12 is obtained as follows, for example. First, the magnetic recording medium 10 having a width of ½ inches is prepared and cut into a length of 250 mm to manufacture a sample. Subsequently, in the magnetic recording medium 10 as the sample, the base layer 12 and the magnetic layer 13 are peeled off from the substrate 11. Next, using a laser hologauge (LGH-110C) manufactured by Mitutoyo Corporation as a measuring device, the thickness of a laminate of the base layer 12 and the magnetic layer 13 peeled off from the substrate 11 is measured at five or more points. Thereafter, the measured values are simply averaged (arithmetically averaged) to calculate the average thickness of the laminate of the base layer 12 and the magnetic layer 13. Note that the measurement points are randomly selected from the sample. Finally, the average thickness of the base layer 12 is determined by subtracting the average thickness of the magnetic layer 13 measured using TEM as described above from the average thickness of the laminate.

The base layer 12 may have pores, that is, the base layer 12 may have a large number of pores. The pores of the base layer 12 may be formed, for example, along with formation of pores (holes 13A) in the magnetic layer 13, and in particular, are formed by pressing a large number of protrusions formed on the surface 14S of the back layer 14 of the magnetic recording medium 10 against the magnetic layer side surface. That is, by forming a recessed portion corresponding to the shape of a protrusion on the surface 13S of the magnetic layer 13, pores can be formed in the magnetic layer 13 and the base layer 12, respectively. Furthermore, pores may be formed as a solvent volatilizes in a step of drying a magnetic layer forming coating material. Furthermore, when the magnetic layer forming coating material is applied to a surface of the base layer 12 in order to form the magnetic layer 13, a solvent in the magnetic layer forming coating material passes through the pores of the base layer 12 formed when the lower layer is applied and dried, and can permeate the base layer 12. Thereafter, when the solvent that has permeated the base layer 12 volatilizes in a step of drying the magnetic layer 13, the solvent that has permeated the base layer 12 moves from the base layer 12 to the surface 13S of the magnetic layer 13, thereby pores may be formed. The pores formed in this way can communicate, for example, the magnetic layer 13 with the base layer 12. The average diameter of the pores can be adjusted by changing the solid content of the magnetic layer forming coating material or the type of a solvent thereof and/or drying conditions of the magnetic layer forming coating material. By forming pores in both the magnetic layer 13 and the base layer 12, a particularly suitable amount of lubricant for good traveling stability appears on the magnetic layer side surface, and an increase in the coefficient of dynamic friction due to repeated recording or reproduction can be further suppressed.

Holes of the base layer 12 are preferably connected to the holes 13A of the magnetic layer 13 from a viewpoint of suppressing a decrease in the coefficient of dynamic friction after repeated recording or reproduction. Here, the state where the holes of the base layer 12 are connected to the holes 13A of the magnetic layer 13 includes a state where some of the large number of holes of the base layer 12 are connected to some of the large number of holes 13A of the magnetic layer 13.

The large number of holes preferably include those extending in a direction perpendicular to the surface 13S of the magnetic layer 13 from a viewpoint of improving a property of supplying the lubricant to the surface 13S of the magnetic layer 13. Furthermore, the holes of the base layer 12 extending in a direction perpendicular to the surface 13S of the magnetic layer 13 are preferably connected to the holes 13A of the magnetic layer 13 extending in a direction perpendicular to the surface 13S of the magnetic layer 13 from a viewpoint of improving a property of supplying the lubricant to the surface 13S of the magnetic layer 13.

(Nonmagnetic Powder of Base Layer 12)

The nonmagnetic powder includes, for example, at least one of inorganic particle powder and organic particle powder. Furthermore, the nonmagnetic powder may include carbon powder such as carbon black. Note that one kind of nonmagnetic powder may be used singly, or two or more kinds of nonmagnetic powder may be used in combination. Examples of the inorganic powder include a metal, a metal oxide, a metal carbonate, a metal sulfate, a metal nitride, a metal carbide, a metal sulfide, and the like. Examples of the shape of the nonmagnetic powder include various shapes such as an acicular shape, a spherical shape, a cubic shape, and a plate shape, but are not limited thereto.

(Binder in Base Layer 12)

The binder in the base layer 12 is similar to that in the magnetic layer 13 described above.

(Back Layer 14)

The back layer 14 includes, for example, a binder and nonmagnetic powder. The back layer 14 may further include at least one additive selected from a lubricant, a curing agent, an antistatic agent, and the like as necessary. The binder and nonmagnetic powder in the back layer 14 are similar to those in the base layer 12 described above.

The nonmagnetic powder in the back layer 14 has an average particle size of preferably 10 nm or more and 150 nm or less, more preferably 15 nm or more and 110 nm or less. The average particle size of the nonmagnetic powder of the back layer 14 is determined in a similar manner to the average particle size of the magnetic powder in the magnetic layer 13 described above. The nonmagnetic powder may include those having a particle size distribution of 2 or more.

An upper limit value of the average thickness of the back layer 14 is preferably 0.6 μm or less, and particularly preferably 0.5 μm or less. When the upper limit value of the average thickness of the back layer 14 is 0.6 μm or less, even in a case where the average thickness of the magnetic recording medium 10 is 5.6 μm or less, the thicknesses of the base layer 12 and the substrate 11 can be kept thick. Therefore, traveling stability of the recording medium 10 in the recording/reproducing device can be maintained. The lower limit value of the average thickness of the back layer 14 is not particularly limited, but is, for example, 0.2 μm or more, and particularly preferably 0.3 μm or more.

The average thickness of the back layer 14 is determined as follows. First, the magnetic recording medium 10 having a width of ½ inches is prepared and cut into a length of 250 mm to manufacture a sample. Next, the thickness of the magnetic recording medium 10 as a sample is measured at five or more points using a laser hologage (LGH-110C) manufactured by Mitutoyo Corporation as a measuring device, and the measured values are simply averaged (arithmetically averaged) to calculate the average thickness $t_T$ [μm] of the magnetic recording medium 10. Note that the measurement points are randomly selected from the sample. Subsequently, the back layer 14 is removed from the magnetic recording medium 10 as a sample with a solvent such as methyl ethyl ketone (MEK) or dilute hydrochloric acid. Thereafter, using the laser hologauge described above again, the thickness of the sample obtained by removing the back layer 14 from the magnetic recording medium 10 is measured at five or more points, and these measured values are simply averaged (arithmetically averaged) to calculate the average thickness $t_B$ [μm] of the magnetic recording medium 10 from which the back layer 14 has been removed. Note that the measurement points are randomly selected from the sample. Finally, the average thickness $t_b$ [μm] of the back layer 14 is determined by the following formula.

$$t_b[\mu m] = t_T[\mu m] - t_B[\mu m]$$

As illustrated in FIG. 1, the back layer 14 has a surface having a large number of protrusions 14A. The large number of protrusions 14A are used for forming a large number of holes 13A on the surface 13S of the magnetic layer 13 in a state where the magnetic recording medium 10 has been wound up in a roll shape. The large number of holes 13A are formed by, for example, a large number of nonmagnetic particles protruding from a surface of the back layer 14.

(Average Thickness of Magnetic Recording Medium 10)

An upper limit value of the average thickness (average total thickness) of the magnetic recording medium 10 is preferably 5.6 μm or less, more preferably 5.2 μm or less, particularly preferably 4.8 μm or less, and still more preferably 4.4 μm or less. When the average thickness of the magnetic recording medium 10 is 5.6 μm or less, the recording capacity that can be recorded in one data cartridge can be increased as compared to a general magnetic recording medium. A lower limit value of the average thickness of the magnetic recording medium 10 is not particularly limited, but is, for example, 3.5 μm or more.

The average thickness $t_T$ of the magnetic recording medium 10 is obtained as follows. First, the magnetic recording medium 10 having a width of ½ inches is prepared and cut into a length of 250 mm to manufacture a sample. Next, the thickness of the sample is measured at five or more points using a laser hologage (LGH-110C) manufactured by Mitutoyo Corporation as a measuring device, and the measured values are simply averaged (arithmetically averaged) to calculate the average value $t_T$ [μm]. Note that the measurement points are randomly selected from the sample.

(Coercive Force Hc)

An upper limit value of the coercive force Hc of the magnetic recording medium 10 in a longitudinal direction thereof is preferably 2000 Oe or less, more preferably 1900 Oe or less, and still more preferably 1800 Oe or less. When the coercive force Hc2 in the longitudinal direction is 2000 Oe or less, magnetization reacts with high sensitivity due to a magnetic field in a perpendicular direction from a recording head. Therefore, a good recording pattern can be formed.

A lower limit value of the coercive force Hc measured in the longitudinal direction of the magnetic recording medium 10 is preferably 1000 Oe or more. When the lower limit value of the coercive force Hc in the longitudinal direction is 1000 Oe or more, demagnetization due to a leakage magnetic flux from a recording head can be suppressed.

The coercive force Hc described above is determined as follows. Three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium can be recognized. Then, using a vibrating sample magnetometer (VSM), an M-H loop of the measurement sample (the entire magnetic recording medium 10) corresponding to the longitudinal direction of the magnetic recording medium 10 (traveling direction of the magnetic recording medium 10) is measured. Next, the coating film (the base layer 12, the magnetic layer 13, the back layer 14, and the like) is wiped off using acetone, ethanol, and the like, leaving only the substrate 11. Then, the three substrates 11 thus obtained are overlapped and bonded with a double-sided tape, and then punched with a φ6.39 mm punch to obtain a background correction sample (hereinafter simply referred to as a correction sample). Thereafter, an M-H loop of the correction sample (substrate 11) corresponding to the longitudinal direction of the substrate 11 (traveling direction of the magnetic recording medium 10) is measured using VSM.

In the measurement of the M-H loop of the measurement sample (the entire magnetic recording medium 10) and the M-H loop of the correction sample (substrate 11), for example, a favorably sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the two M-H loops are obtained, the M-H loop of the correction sample (substrate 11) is subtracted from the M-H loop of the measurement sample (the entire magnetic recording medium 10) to perform background correction, and an M-H loop after background correction is obtained. For the calculation of background correction, a measurement/analysis program attached to "VSMP7-15 type" is used.

The coercive force Hc is determined from the obtained M-H loop after background correction. Note that for this calculation, a measurement/analysis program attached to "VSM-P7-15" is used. Note that each of the above measurements of the M-H loops is performed at 25° C. Furthermore, when the M-H loop is measured in the longitudinal direction of the magnetic recording medium 10, "demagnetizing field correction" is not performed.

(Squareness ratio) The magnetic recording medium 10 has a squareness ratio S1 of, for example, 65% or more, preferably 70% or more, more preferably 75% or more, still more preferably 80% or more, particularly preferably 85% or more in a perpendicular direction (thickness direction) of the magnetic recording medium 10. When the squareness ratio S1 is 65% or more, perpendicular orientation of magnetic powder is sufficiently high. Therefore, better SNR can be obtained.

The squareness ratio S1 is determined as follows. Three magnetic recording media 10 are overlapped and bonded with a double-sided tape, and then punched with a 0.39 mm punch to manufacture a measurement sample. At this time, marking is performed with an arbitrary ink having no magnetism such that the longitudinal direction (traveling direction) of the magnetic recording medium can be recognized. Then, using a vibrating sample magnetometer (VSM), an M-H loop of the measurement sample (the entire magnetic recording medium 10) corresponding to the longitudinal direction of the magnetic recording medium 10 (traveling direction of the magnetic recording medium 10) is measured. Next, the coating film (the base layer 12, the magnetic layer 13, the back layer 14, and the like) is wiped off using acetone, ethanol, and the like, leaving only the substrate 11. Then, the three substrates 11 thus obtained are overlapped and bonded with a double-sided tape, and then punched with a φ6.39 mm punch to obtain a background correction sample (hereinafter simply referred to as a correction sample). Thereafter, an M-H loop of the correction sample (substrate 11) corresponding to the longitudinal direction of the substrate 11 (traveling direction of the magnetic recording medium 10) is measured using VSM.

In the measurement of the M-H loop of the measurement sample (the entire magnetic recording medium 10) and the M-H loop of the correction sample (substrate 11), for example, a favorably sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the two M-H loops are obtained, the M-H loop of the correction sample (substrate 11) is subtracted from the M-H loop of the measurement sample (the entire magnetic recording medium 10) to perform background correction, and an M-H loop after background correction is obtained. For the calculation of background correction, a measurement/analysis program attached to "VSMP7-15 type" is used.

The squareness ratio S1 (%) is calculated by putting saturation magnetization Ms (emu) and residual magnetization Mr (emu) of the obtained M-H loop after background correction into the following formula.

Squareness ratio $S1(\%) = (Mr/Ms) \times 100$

Note that each of the above measurements of the M-H loops is performed at 25° C. Furthermore, when the M-H loop is measured in the perpendicular direction of the magnetic recording medium 10, "demagnetizing field correction" is not performed.

The magnetic recording medium 10 has a squareness ratio S2 of preferably 35% or less, more preferably 30% or less, still more preferably 25% or less, particularly preferably 20% or less, most preferably 15% or less in the longitudinal direction (traveling direction) of the magnetic recording medium 10. When the squareness ratio S2 is 35% or less, perpendicular orientation of magnetic powder is sufficiently high. Therefore, better SNR can be obtained.

The squareness ratio S2 is determined in a similar manner to the squareness ratio S1 except that the M-H loop is measured in the longitudinal direction (traveling direction) of the magnetic recording medium 10 and the substrate 11.

(Activation Volume Vact)

An activation volume Vact is preferably 8000 $nm^3$ or less, more preferably 6000 $nm^3$ or less, still more preferably 5000 $nm^3$ or less, particularly preferably 4000 $nm^3$ or less, and most preferably 3000 $nm^3$ or less. When the activation volume Vact is 8000 $nm^3$ or less, a dispersed state of magnetic powder is good. Therefore, a bit inversion region can be made steep, and it is possible to suppress deterioration of a magnetization signal recorded in an adjacent track due to a leakage magnetic field from a recording head. Therefore, a better SNR can be obtained.

The activation volume Vact described above is determined by the following formula derived by Street & Woolley.

$Vact(nm^3) = kB \times T \times Xirr/(\mu 0 \times Ms \times S)$ (In which kB: Boltzmann's constant ($1.38 \times 10^{-23}$ J/K), T: temperature (K), Xirr: irreversible susceptibility, μ0: vacuum permeability, S: magnetic viscosity coefficient, Ms: saturation magnetization ($emu/cm^3$))

The irreversible susceptibility Xirr, the saturation magnetization Ms, and the magnetic viscosity coefficient S to be put in the above formula are determined using VSM as follows. A measurement sample used for VSM is manufactured by punching out a product obtained by overlapping three magnetic recording media 10 with a double-sided tape with a φ6.39 mm punch. At this time, marking is performed with an arbitrary ink having no magnetism such that the longitudinal direction (traveling direction) of the magnetic recording medium 10 can be recognized. Note that a measurement direction using VSM is the thickness direction (perpendicular direction) of the magnetic recording medium 10. Furthermore, the measurement using VSM is performed at 25° C. for a measurement sample cut out from the long magnetic recording medium 10. Furthermore, when the M-H loop is measured in the thickness direction (perpendicular direction) of the magnetic recording medium 10, "demagnetizing field correction" is not performed. Moreover, in the measurement of the M-H loop of the measurement sample (the entire magnetic recording medium 10) and the M-H loop of the correction sample (substrate 11), a highly sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

(Irreversible Susceptibility Xirr)

The irreversible susceptibility Xirr is defined as an inclination near a residual coercive force Hr in the inclination of a residual magnetization curve (DCD curve). First, a magnetic field of −1193 kA/m (15 kOe) is applied to the entire magnetic recording medium 10, and the magnetic field is returned to zero to obtain a residual magnetization state. Thereafter, a magnetic field of about 15.9 kA/m (200 Oe) is applied in the opposite direction to return the magnetic field to zero again, and a residual magnetization amount is measured. Thereafter, similarly, measurement of applying a magnetic field larger than the previously applied magnetic field by 15.9 kA/m to return the magnetic field to zero is repeated, and a residual magnetization amount is plotted with respect to an applied magnetic field to form a DCD curve. From the obtained DCD curve, a point where the magnetization amount is zero is taken as a residual coercive force Hr, the DCD curve is differentiated, and the inclination of the DCD curve at each magnetic field is determined. In the inclination of this DCD curve, an inclination near the residual coercive force Hr is Xirr.

(Saturation Magnetization Ms)

First, in a similar manner to the above method for measuring a coercive force Hc, an M-H loop after background correction is obtained. Next, Ms ($emu/cm^3$) is calculated from a value of saturation magnetization Ms (emu) of the obtained M-H loop and the volume ($cm^3$) of the magnetic layer 13 in the measurement sample. Note that the volume of the magnetic layer 13 is determined by multiplying the area of the measurement sample by an average thickness of the magnetic layer 13. The method for calculating the average thickness of the magnetic layer 13 necessary for calculating the volume of the magnetic layer 13 is as described above.

(Magnetic Viscosity Coefficient S)

First, a magnetic field of −1193 kA/m (15 kOe) is applied to the entire magnetic recording medium 10 (measurement sample), and the magnetic field is returned to zero to obtain a residual magnetization state. Thereafter, a magnetic field equivalent to the value of the residual coercive force Hr obtained from the DCD curve is applied in the opposite direction. A magnetization amount is continuously measured at constant time intervals for 1000 seconds in a state where a magnetic field is applied. A magnetic viscosity coefficient S is calculated by comparing a relationship between time t and a magnetization amount M(t), obtained in this way, with the following formula.

$$M(t) = M0 + S \times \ln(t)$$

(In which M(t): magnetization amount at time t, M0: initial magnetization amount, S:

magnetic viscosity coefficient, ln(t): natural logarithm of time)

(Friction coefficient ratio ($\mu_B/\mu_A$))

The magnetic recording medium 10 has a friction coefficient ratio ($\mu_B/\mu_A$) of preferably 1.0 or more and 2.0 or less, more preferably 1.0 or more and 1.8 or less, still more preferably 1.0 or more and 1.6 or less, in which $\mu_A$ represents a coefficient of dynamic friction between the surface 13S of the magnetic layer 13 of the magnetic recording medium 10 and a magnetic head in a state where a tension of 0.4 N is applied to the magnetic recording medium 10 in a longitudinal direction thereof, and $\mu_B$ represents a coefficient of dynamic friction between the surface 13S of the magnetic layer 13 of the magnetic recording medium 100 and the magnetic head in a state where a tension of 1.2 N is applied to the magnetic recording medium 10 in the longitudinal direction. The friction coefficient ratio ($\mu_B/\mu_A$) within the above numerical range can reduce a change in the coefficient of dynamic friction due to the tension fluctuation during traveling, and therefore can stabilize traveling of the magnetic recording medium 10.

Figure 8:
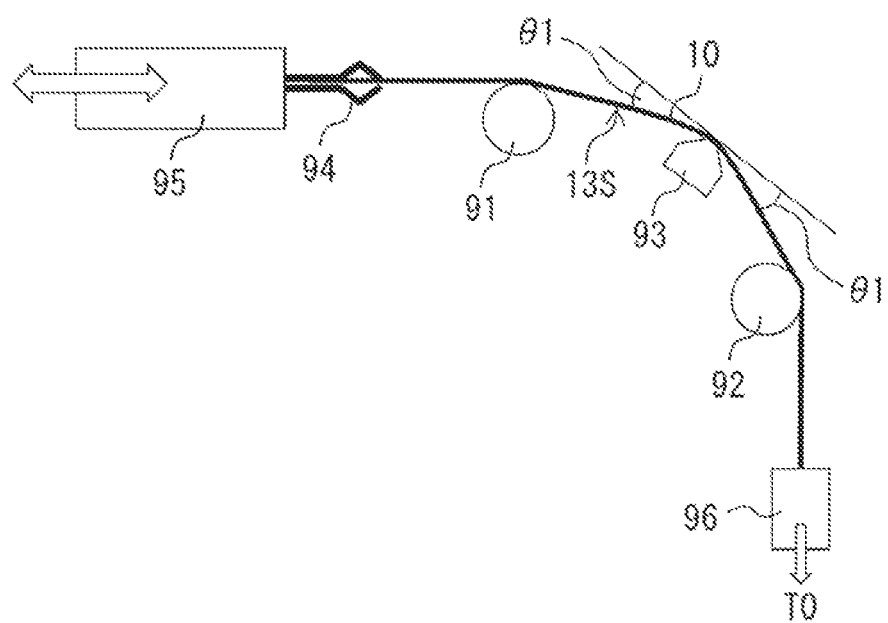
FIG. 8 is a schematic diagram illustrating a method for measuring a coefficient of dynamic friction.

The coefficient of dynamic friction $\mu_A$ and the coefficient of dynamic friction $\mu_B$ for calculating the friction coefficient ratio ($\mu_B/\mu_A$) are determined as follows. First, as illustrated in FIG. 8, the magnetic recording medium 10 with a width of ½ inches is placed on two cylindrical guide rolls 91 and 92 with a diameter of one inch disposed in parallel to and spaced apart from each other such that the surface 13S of the magnetic layer 13 is in contact with the guide rolls 91 and 92. The two guide rolls 91 and 92 have a fixed positional relationship with each other.

Subsequently, the magnetic recording medium 10 is brought into contact with a head block (for recording/reproducing) 93 mounted on an LTO5 drive such that the surface 13S of the magnetic layer 13 is in contact with the head block 93 and a holding angle θ1 [°] is 5.6°. One end of the magnetic recording medium 10 is held by a gripping jig 94 and connected to a movable strain gauge 95, and a weight 96 is suspended from the other end of the magnetic recording medium 10 to apply a tension T0 of 0.4 N. Note that the head block 93 is fixed at a position where the holding angle θ1 [°] is 5.6°. As a result, the positional relationship between the guide rolls 91 and 92 and the head block 93 is also fixed.

Subsequently, the magnetic recording medium 10 is slid by 60 mm toward the movable strain gauge 95 at a speed of 10 mm/s with respect to the head block 93 by the movable strain gauge 95. An output value (voltage) of the movable strain gauge 95 at the time of sliding is converted into T [N] on the basis of a linear relationship (described later) between an output value acquired in advance and a load. T [N] is acquired 13 times from the start of sliding to the end of sliding for the 60 mm slide described above, and 11 values of T [N] excluding totally two times of the first and last times are simply averaged to obtain $T_{ave}$ [N].

Thereafter, the coefficient of dynamic friction $\mu_A$ is determined by the following formula.

$$\mu_A = \frac{1}{(\theta_1[°]) \times (\pi/180)} \times \ln\left(\frac{T_{ave}[N]}{T_0[N]}\right) \quad \text{[Numerical Formula 1]}$$

The linear relationship described above is obtained as follows. That is, an output value (voltage) of the movable strain gauge 95 is obtained for each of cases where a load of 0.4 N is applied to the movable strain gauge 95 and a load of 1.5 N is applied thereto. From the obtained two output values and the two loads, a linear relationship between the output value and the load is obtained. Using the linear relationship, as described above, the output value (voltage) from the movable strain gauge 95 during sliding is converted into T [N].

The coefficient of dynamic friction $\mu_B$ is measured by the same method as the method for measuring the coefficient of dynamic friction $\mu_A$ except that the tension $T_0$ [N] applied to the other end is set to 1.2 N.

The friction coefficient ratio ($\mu_B/\mu_A$) is calculated from the coefficient of dynamic friction $\mu_A$ and the coefficient of dynamic friction $\mu_B$ measured as described above.

In a case where the coefficient of dynamic friction between the surface 13S of the magnetic layer 13 and the magnetic head is represented by pc when a tension of 0.6 N is applied to the magnetic recording medium 10, a friction coefficient ratio (µC(1000)/µC(5)) between the fifth coefficient of dynamic friction µC (5) from the start of travel and the 1000th coefficient of dynamic friction µC (1000) from the start of travel is preferably 1.0 or more and 2.0 or less, and more preferably 1.2 or more and 1.8 or less. When the friction coefficient ratio (µC(1000)/µC(5)) is 1.0 or more and 2.0 or less, a change in the coefficient of dynamic friction due to traveling many times can be reduced, and therefore traveling of the magnetic recording medium 10 can be stabilized. Here, a magnetic head with a drive corresponding to the magnetic recording medium 10 is used as the magnetic head.

(Friction coefficient ratio ($\mu C_{(1000)}/\mu C_{(5)}$)) The coefficient of dynamic friction µC(5) and the coefficient of dynamic friction µC(1000) for calculating the friction coefficient ratio (µC(1000)/µC(5)) are determined as follows.

The magnetic recording medium 10 has the friction coefficient ratio ($\mu C_{(1000)}/\mu C_{(5)}$) of preferably 1.0 to 2.0, more preferably 1.0 to 1.8, still more preferably 1.0 to 1.6, in which the friction coefficient ratio ($\mu C_{(1000)}/\mu C_{(5)}$) represents a friction coefficient ratio between the coefficient of dynamic friction $\mu C_{(5)}$ at the fifth reciprocation in a case where the magnetic recording medium in a state where a tension of 0.6 N is applied to the magnetic recording medium 10 in a longitudinal direction thereof is reciprocatably slid five times on a magnetic head and the coefficient of dynamic friction $\mu C_{(1000)}$ at the 1000th reciprocation in a case where the magnetic recording medium 10 is reciprocated 1000 times on the magnetic head. The friction coefficient ratio ($\mu C_{(1000)}/\mu C_{(5)}$) within the above numerical range can reduce a change in the coefficient of dynamic friction due to traveling many times, and therefore can stabilize traveling of the magnetic recording medium 10.

The coefficient of dynamic friction $\mu C_{(5)}$ and the coefficient of dynamic friction $\mu C_{(1000)}$ for calculating the friction coefficient ratio ($\mu C_{(1000)}/\mu C_{(5)}$) are determined as follows.

The magnetic recording medium 10 is connected to a movable strain gauge 71 in the same manner as the method for measuring the coefficient of dynamic friction $\mu_A$ except that the tension $T_0$ [N] applied to the other end of the magnetic recording medium 10 is set to 0.6 N. Then, the magnetic recording medium 10 is slid 60 mm toward the movable strain gauge at 10 mm/s with respect to the head block 74 (forward path) and slid 60 mm away from the movable strain gauge (return path). This reciprocating operation is repeated 1000 times. Among the 1000 reciprocating operations, a strain gauge output value (voltage) is acquired 13 times from the start of sliding to the end of sliding for the 60 mm slide in the fifth forward path, and the output value is converted into T [N] on the basis of a linear relationship (described later) between an output value determined for the coefficient of dynamic friction $\mu_A$ and a load. Eleven values of T [N] excluding totally two times of the first and last times are simply averaged to determine $T_{ave}$ [N]. The coefficient of dynamic friction $\mu C_{(5)}$ is determined by the following formula.

$$\mu_{C(5)} = \frac{1}{(\theta_1[°]) \times (\pi/180)} \times \ln\left(\frac{T_{ave}[N]}{T_0[N]}\right) \quad \text{[Numerical Formula 2]}$$

Moreover, the coefficient of dynamic friction $\mu C_{(1000)}$ is determined in a similar manner to the coefficient of dynamic friction $\mu C_{(5)}$ except that measurement is performed for the 1000th forward path.

The friction coefficient ratio $\mu C_{(1000)}/\mu C_{(5)}$ is calculated from the coefficient of dynamic friction $\mu C_{(5)}$ and the coefficient of dynamic friction $\mu C_{(1000)}$ measured as described above.

[1-2 Method for Manufacturing Magnetic Recording Medium 10]

Next, a method for manufacturing the magnetic recording medium 10 having the above-described configuration will be described. First, by kneading and dispersing nonmagnetic powder, a binder, a lubricant, and the like in a solvent, a base layer forming coating material is prepared. Next, by kneading and dispersing magnetic powder, a binder, a lubricant, and the like in a solvent, a magnetic layer forming coating material is prepared. Next, by kneading and dispersing a binder, nonmagnetic powder, and the like in a solvent, a back layer forming coating material is prepared. For preparing the magnetic layer forming coating material, the base layer forming coating material, and the back layer forming coating material, for example, the following solvents, dispersing devices, and kneading devices can be used.

Examples of the solvent used for preparing the above-described coating material include a ketone-based solvent such as acetone, methyl ethyl ketone, methyl isobutyl ketone, or cyclohexanone, an alcohol-based solvent such as methanol, ethanol, or propanol, an ester-based solvent such as methyl acetate, ethyl acetate, butyl acetate, propyl acetate, ethyl lactate, or ethylene glycol acetate, an ether-based solvent such as diethylene glycol dimethyl ether, 2-ethoxyethanol, tetrahydrofuran, or dioxane, an aromatic hydrocarbon-based solvent such as benzene, toluene, or xylene, a halogenated hydrocarbon-based solvent such as methylene chloride, ethylene chloride, carbon tetrachloride, chloroform, or chlorobenzene, and the like. These solvents may be used singly, or may be used in a mixture thereof appropriately.

Examples of a kneading device used for preparing the above-described coating material include a continuous twin-screw kneading machine, a continuous twin-screw kneading machine capable of performing dilution in multiple stages, a kneader, a pressure kneader, a roll kneader, and the like, but are not particularly limited to these devices. Furthermore, examples of a dispersing device used for preparing the above-described coating material include a roll mill, a ball mill, a horizontal sand mill, a vertical sand mill, a spike mill, a pin mill, a tower mill, a pearl mill (for example, "DCP mill" manufactured by Eirich Co., Ltd. and the like), a homogenizer, an ultrasonic wave dispersing machine, and the like, but are not particularly limited to these devices.

Next, the base layer forming coating material is applied to one main surface 11A of the substrate 11 and dried to form the base layer 12. Subsequently, by applying the magnetic layer forming coating material onto the base layer 12 and drying the magnetic layer forming coating material, the magnetic layer 13 is formed on the base layer 12. Note that during drying, magnetic powder is preferably subjected to magnetic field orientation in the thickness direction of the substrate 11 by, for example, a solenoid coil. Furthermore, during drying, the magnetic powder may be subjected to magnetic field orientation in a traveling direction (longitudinal direction) of the substrate 11 by, for example, a solenoid coil, and then may be subjected to magnetic field orientation in a thickness direction of the substrate 11. By performing such a magnetic field orientation treatment, the degree of vertical orientation (that is, squareness ratio S1) of the magnetic powder can be improved. After the magnetic layer 13 is formed, the back layer forming coating material is applied to the other main surface 11B of the substrate 11 and dried to form the back layer 14. As a result, the magnetic recording medium 10 is obtained.

The squareness ratios S1 and S2 are set to desired values, for example, by adjusting the intensity of a magnetic field applied to a coating film of the magnetic layer forming coating material, the concentration of a solid content in the magnetic layer forming coating material, and drying conditions (drying temperature and drying time) of the coating film of the magnetic layer forming coating material. The intensity of a magnetic field applied to a coating film is preferably at least twice the coercive force of the magnetic powder. In order to further increase the squareness ratio S1 (that is, to further reduce the squareness ratio S2), it is preferable to improve the dispersion state of the magnetic powder in the magnetic layer forming coating material. Furthermore, in order to further increase the squareness ratio S1, it is also effective to magnetize the magnetic powder before the magnetic layer forming coating material is put into an orientation device for magnetic field orientation of the magnetic powder. Note that the above methods for adjusting the squareness ratios S1 and S2 may be used singly or in combination of two or more thereof.

Thereafter, the obtained magnetic recording medium 10 is calendered to smooth the surface 13S of the magnetic layer 13. Next, the magnetic recording medium 10 that has been calendered is wound into a roll shape. Thereafter, the magnetic recording medium 10 is heated in this state, and the large number of protrusions 14A on the surface of the back layer 14 are thereby transferred onto the surface 13S of the magnetic layer 13. As a result, the large number of holes 13A are formed on the surface 13S of the magnetic layer 13.

The temperature of the heat treatment is preferably 50° C. or higher and 80° C. or lower. When the temperature of the heat treatment is 50° C. or higher, good transferability can be obtained. Meanwhile, when the temperature of the heat treatment is 80° C. or higher, the amount of pores may be excessively increased, and the lubricant on the surface 13S of the magnetic layer 13 may be excessive. Here, the temperature of the heat treatment is the temperature of an atmosphere holding the magnetic recording medium 10.

Time for the heat treatment is preferably 15 hours or more and 40 hours or less. When the time for heat treatment is 15 hours or more, good transferability can be obtained. Meanwhile, when the time for heat treatment is 40 hours or less, a decrease in productivity can be suppressed.

Finally, the magnetic recording medium 10 is cut into a predetermined width (for example, a width of ½ inches). As a result, the target magnetic recording medium 10 is obtained.

In the above manufacturing method, the large number of protrusions 14A formed on the surface 14S of the back layer 14 are transferred onto the surface 13S of the magnetic layer 13, and pores (holes 13A) are thereby formed on the surface of the magnetic layer 13. However, the method for forming the pores is not limited thereto. For example, pores may be formed on the surface 13S of the magnetic layer 13 by adjusting the type of a solvent included in the magnetic layer forming coating material and/or adjusting drying conditions of the magnetic layer forming coating material. Furthermore, for example, in the process of drying the solvent of the magnetic layer forming coating material, pores can be formed by an uneven distribution of the solid and the solvent included in the magnetic layer forming coating material. Furthermore, in the process of applying the magnetic layer forming coating material, the solvent included in the magnetic layer forming coating material can also be absorbed by the base layer 12 through the pores of the base layer 12 formed when the lower layer is applied and dried. In the drying step after the application, the solvent moves from the base layer 12 through the magnetic layer 13, and pores connecting the magnetic layer 13 to the base layer 12 can be thereby formed.

[1-3. Configuration of Recording/Reproducing Device 30]

Next, the configuration of the recording/reproducing device 30 for recording information on the magnetic recording medium 10 described above and reproducing information from the magnetic recording medium 10 described above will be described with reference to FIG. 4.

The recording/reproducing device 30 can adjust a tension applied to the magnetic recording medium 10 in a longitudinal direction thereof. Furthermore, the recording/reproducing device 30 can load the magnetic recording medium cartridge 10A thereon. Here, for ease of explanation, a case where the recording/reproducing device 30 can load one magnetic recording medium cartridge 10A thereon will be described. However, in the present disclosure, the recording/reproducing device 30 can load a plurality of magnetic recording medium cartridges 10A thereon.

The recording/reproducing device 30 is connected to information processing devices such as a server 41 and a personal computer (hereinafter referred to as "PC") 42, for example, through a network 43, and data supplied from these information processing devices can be recorded in the magnetic recording medium cartridge 10A.

Figure 4:
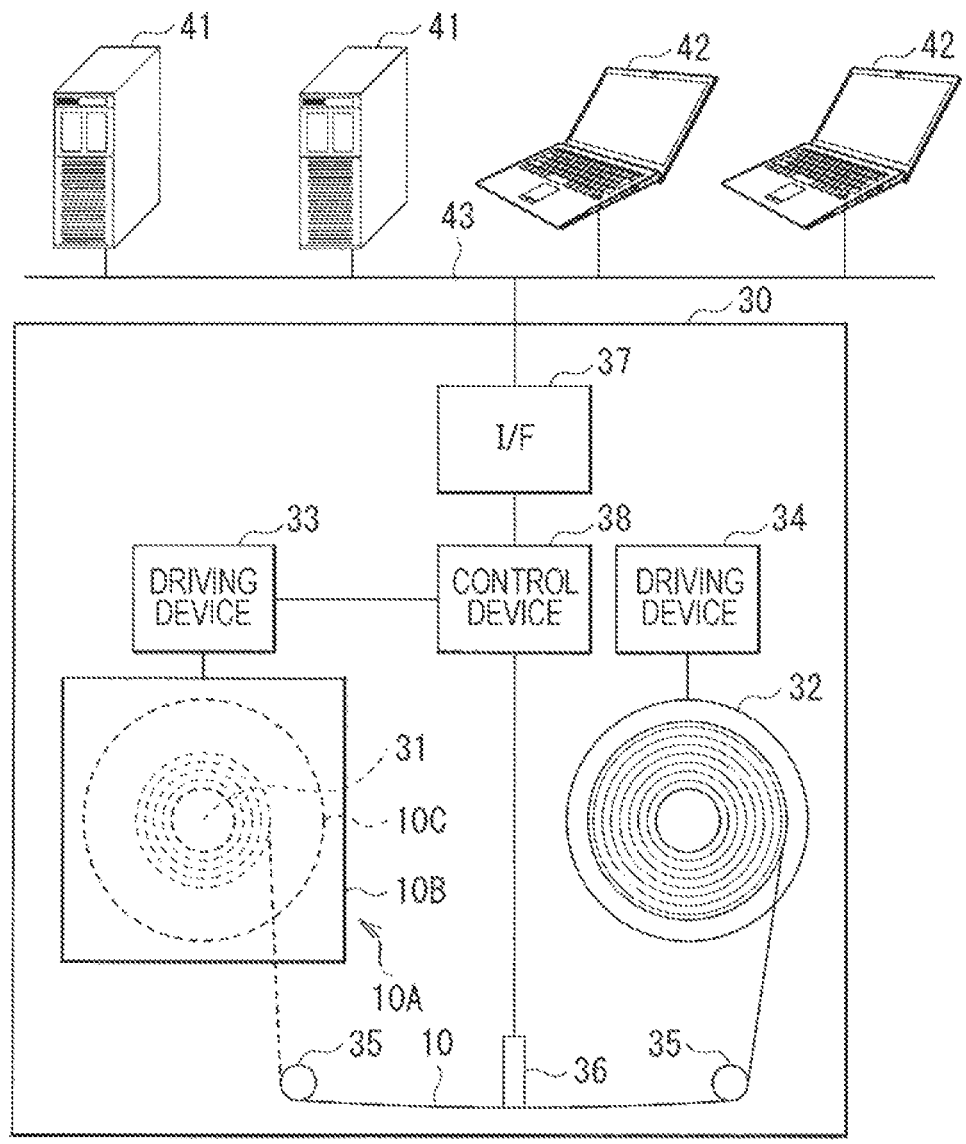
FIG. 4 is a schematic diagram of a recording/reproducing device using the magnetic recording medium illustrated in FIG. 1.

As illustrated in FIG. 4, the recording/reproducing device 30 includes a spindle 31, a reel 32, a driving device 33, a driving device 34, a plurality of guide rollers 35, a head unit 36, a communication interface (hereinafter referred to as I/F) 37, and a control device 38.

The spindle 31 can mount the magnetic recording medium cartridge 10A thereon. The magnetic recording medium cartridge 10A complies with the linear tape open (LTO) standard, and rotatably houses a single reel 10C in which the magnetic recording medium 10 is wound in a cartridge case 10B. A V-shaped servo pattern is recorded in advance as a servo signal on the magnetic recording medium 10. The reel 32 can fix a tip of the magnetic recording medium 10 pulled out from the magnetic recording medium cartridge 10A.

The driving device 33 rotationally drives the spindle 31. The driving device 34 rotationally drives the reel 32. When data is recorded or reproduced on the magnetic recording medium 10, the driving device 33 and the driving device 34 rotationally drive the spindle 31 and the reel 32, respectively, to cause the magnetic recording medium 10 to travel. The guide roller 35 is a roller for guiding traveling of the magnetic recording medium 10.

The head unit 36 includes a plurality of recording heads for recording data signals on the magnetic recording medium 10, a plurality of reproducing heads for reproducing data signals recorded on the magnetic recording medium 10, and a plurality of servo heads for reproducing servo signals recorded on the magnetic recording medium 10. As the recording head, for example, a ring type head can be used, and as the reproducing head, for example, a magnetoresistive effect type magnetic head can be used. However, the types of the recording head and reproducing head are not limited thereto.

The I/F 37 is for communicating with an information processing device such as the server 41 or the PC 42, and is connected to the network 43.

The control device 38 controls the entire recording/reproducing device 30. For example, the control device 38 causes the head unit 36 to record a data signal supplied from an information processing device such as the server 41 or the PC 42 on the magnetic recording medium 10 in response to a request from the information processing device. Furthermore, the control device 38 causes the head unit 36 to reproduce the data signal recorded on the magnetic recording medium 10 in response to a request from an information processing device such as the server 41 or the PC 42 and supplies the data signal to the information processing device.

[1-4 Effect]

As described above, the magnetic recording medium 10 of the present embodiment is a tape-shaped member in which the substrate 11, the base layer 12, and the magnetic layer 13 are laminated, and satisfies the following constituent requirements (1) to (8).

(1) The substrate 11 includes a polyester as a main component.

(2) The average thickness of the base layer 12 is 0.9 μm or less.

(3) The base layer 12 and the magnetic layer 13 each include a lubricant.

(4) The magnetic layer 13 has a surface 13S having a large number of holes 13A, and the arithmetic average roughness Ra of the surface 13S is 2.5 nm or less.

(5) The BET specific surface area of the entire magnetic recording medium 10 is 3.5 $m^2/g$ or more in a state where the lubricant has been removed from the magnetic recording medium 10 and the magnetic recording medium 10 has been dried.

(6) The squareness ratio in the perpendicular direction is 65% or more.

(7) The average thickness of the magnetic layer 13 is 90 nm or less.

(8) The average thickness of the magnetic recording medium 10 is 5.6 μm or less.

Because of having such a configuration, the magnetic recording medium 10 of the present embodiment can suppress an increase in the coefficient of dynamic friction after repeated recording or repeated reproduction is executed even in a case where the total thickness is thin. Furthermore, since the base layer 12 is relatively thin, material cost can be reduced, and the winding amount of the magnetic recording medium 10 that can be loaded on one magnetic recording medium cartridge 10A can be improved. Moreover, since the thickness of the base layer 12 with respect to the thickness of the substrate 11 is reduced, the Young's modulus of the entire magnetic recording medium 10 can be reduced. Since the Young's modulus of the base layer 12 including non-magnetic powder and a binder is higher than that of the substrate 11 including a polyester as a main component, even if the thickness of the magnetic recording medium 10 is unchanged, by reducing the thickness of the base layer 12 with respect to the thickness of the substrate 11, the substrate 11 becomes more dominant as a factor that determines the Young's modulus of the magnetic recording medium 10. Since the Young's modulus of the entire magnetic recording medium 10 can be reduced, in a case where the magnetic recording medium 10 travels while a tension is applied to the magnetic recording medium 10 in a longitudinal direction thereof, responsiveness of deformation of the magnetic recording medium 10 with respect to the applied tension is improved. Therefore, when recording or reproduction is performed in the recording/reproducing device 30, traveling stability of the magnetic recording medium 10 can be improved.

<2. Modification>

(Modification 1)

Figure 5:
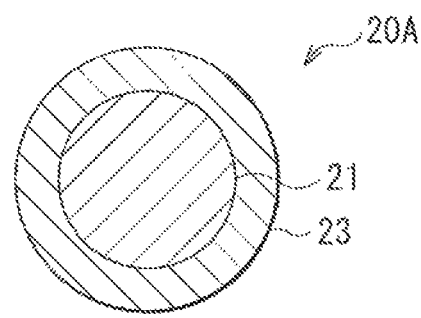
FIG. 5 is a cross-sectional view schematically illustrating a cross-sectional structure of an c iron oxide particle as a modification.

In the embodiment described above, the ε iron oxide particle 20 (FIG. 3) having the two-layered shell portion 22 has been illustrated and described, but the magnetic recording medium of the present technology may include, for example, as illustrated in FIG. 5, an ε iron oxide particle 20A having a single-layered shell portion 23. The shell portion 23 in the ε iron oxide particle 20A has a similar configuration to the first shell portion 22a, for example. However, the ε iron oxide particle 20 having the two-layered shell portion 22 described in the embodiment described above is more preferable than the ε iron oxide particle 20A of Modification 1 from a viewpoint of suppressing characteristic deterioration.

(Modification 2)

In the magnetic recording medium 10 according to the embodiment described above, the case where the ε iron oxide particle 20 having a core-shell structure has been illustrated and described. However, the ε iron oxide particle may include an additive instead of the core-shell structure, or may have a core-shell structure and include an additive. In this case, some of Fe atoms in the ε iron oxide particles are replaced with an additive. Even by inclusion of an additive in an ε iron oxide particle, a coercive force Hc of the entire ε iron oxide particles can be adjusted to a coercive force Hc suitable for recording. Therefore, record ability can be improved. The additive is a metal element other than iron, preferably a trivalent metal element, more preferably at least one of aluminum (Al), gallium (Ga), and indium (In), and still more preferably at least one of Al and Ga.

Specifically, the ε iron oxide including an additive is an $\varepsilon\text{-Fe}_{2-x}M_xO_3$ crystal (in which M represents a metal element other than iron, preferably a trivalent metal element, more preferably at least one of Al, Ga, and In, and still more preferably at least one of Al and Ga, and x satisfies, for example, $0<x<1$).

(Modification 3)

The magnetic powder of the present disclosure may include powder of nanoparticles including hexagonal ferrite (hereinafter referred to as "hexagonal ferrite particles") instead of the powder of ε iron oxide particles. The hexagonal ferrite particle has, for example, a hexagonal plate shape or a substantially hexagonal plate shape. The hexagonal ferrite preferably includes at least one of barium (Ba), strontium (Sr), lead (Pb), and calcium (Ca), more preferably at least one of Ba and Sr. Specifically, the hexagonal ferrite may be, for example, barium ferrite or strontium ferrite. The barium ferrite may further include at least one of Sr, Pb, and Ca in addition to Ba. The strontium ferrite may further include at least one of Ba, Pb, and Ca in addition to Sr.

More specifically, the hexagonal ferrite has an average composition represented by a general formula $MFe_{12}O_{19}$. However, M represents at least one metal of Ba, Sr, Pb, and Ca, preferably at least one metal of Ba and Sr, for example. M may represent a combination of Ba and one or more metals selected from the group consisting of Sr, Pb, and Ca. Furthermore, M may represent a combination of Sr and one or more metals selected from the group consisting of Ba, Pb, and Ca. In the above general formula, some of Fe atoms may be replaced with other metal elements.

In a case where the magnetic powder includes powder of hexagonal ferrite particles, the average particle size of the magnetic powder is preferably 50 nm or less, more preferably 40 nm or less, and still more preferably 30 nm or less. The average particle size of the magnetic powder is more preferably 25 nm or less, 22 nm or less, 21 nm or less, or 20 nm or less. Furthermore, the average particle size of the magnetic powder is, for example, 10 nm or more, preferably 12 nm or more, and more preferably 15 nm or more. Therefore, the average particle size of the magnetic powder including powder of hexagonal ferrite particles can be, for example, 10 nm or more and 50 nm or less, 10 nm or more and 40 nm or less, 12 nm or more and 30 nm or less, 12 nm or more and 25 nm or less, or 15 nm or more and 22 nm or less. In a case where the average particle size of the magnetic powder is the above upper limit value or less (for example, 50 nm or less, particularly 30 nm or less), in the magnetic recording medium 10 having a high recording density, good electromagnetic conversion characteristics (for example, SNR) can be obtained. In a case where the average particle size of the magnetic powder is the above lower limit value or more (for example, 10 nm or more, preferably 12 nm or more), the dispersibility of the magnetic powder is further improved, and better electromagnetic conversion characteristics (for example, SNR) can be obtained.

In a case where the magnetic powder includes hexagonal ferrite particles, the average aspect ratio of the magnetic powder can be preferably 1 or more and 3.5 or less, more preferably 1 or more and 3.1 or less, or 1.5 or more and 3.0 or less, and still more preferably 1.8 or more and 2.8 or less. When the average aspect ratio of the magnetic powder is within the above numerical range, aggregation of the magnetic powder can be suppressed, and moreover, resistance applied to the magnetic powder can be suppressed when the magnetic powder is vertically oriented in a step of forming the magnetic layer 13. This can improve the vertical orientation of the magnetic powder.

Note that the average particle size and average aspect ratio of the magnetic powder including powder of hexagonal ferrite particles are determined as follows. First, the magnetic recording medium 10 to be measured is processed to be thinned by a focused ion beam (FIB) method and the like. Thinning is performed in the length direction (longitudinal direction) of the magnetic tape. Cross-sectional observation is performed for the obtained thin sample such that the entire recording layer is included with respect to the thickness direction of the recording layer using a transmission electron microscope (H-9500 manufactured by Hitachi High-Technologies) with an acceleration voltage of 200 kV and an overall magnification of 500,000 times. Next, from the imaged TEM photograph, 50 particles each having a side surface directed to an observation surface are selected, and maximum plate thicknesses DA of the particles are measured. The maximum plate thicknesses DA thus determined are simply averaged (arithmetically averaged) to determine an average maximum plate thickness DAave. Subsequently, plate diameters DB of the particles of the magnetic powder are measured. Here, the plate diameter DB means the largest distance among distances between two parallel lines drawn from all angles so as to come into contact with an outline of each of the particles of the magnetic powder (so-called maximum Feret diameter). Subsequently, the measured plate diameters DB are simply averaged (arithmetically averaged) to determine an average plate diameter DBave. Then, an average aspect ratio (DBave/DAave) of the particles is determined from the average maximum plate thickness DAave and the average plate diameter DBave.

In a case where the magnetic powder includes powder of hexagonal ferrite particles, the average particle volume of the magnetic powder is preferably 5900 nm$^3$ or less, more preferably 500 nm$^3$ or more and 3400 nm$^3$ or less, and still more preferably 1000 nm$^3$ or more and 2500 nm$^3$ or less. When the average particle volume of the magnetic powder is 5900 nm$^3$ or less, a similar effect to that in a case where the average particle size of the magnetic powder is 30 nm or less can be obtained. Meanwhile, when the average particle volume of the magnetic powder is 500 nm$^3$ or more, a similar effect to a case where the average particle size of the magnetic powder is 12 nm or more can be obtained.

Note that the average particle volume of the magnetic powder is determined as follows. First, the average maximum plate thickness DAave and the average plate diameter DBave are determined by the above-described method for calculating the average particle size of the magnetic powder. Next, an average volume V of the ε iron oxide particles is determined by the following formula.

$$V = 3\sqrt{3}/8 \times DAave \times DBave \times DBave^2$$

According to a particularly preferable embodiment of the present technology, the magnetic powder can be barium ferrite magnetic powder or strontium ferrite magnetic powder, and more preferably barium ferrite magnetic powder. Barium ferrite magnetic powder includes iron oxide magnetic particles having barium ferrite as a main phase (hereinafter referred to as "barium ferrite particles"). Barium ferrite magnetic powder has high data recording reliability. For example, barium ferrite magnetic powder keeps coercive force even in a high-temperature and high-humidity environment. Barium ferrite magnetic powder is preferable as the magnetic powder from such a viewpoint.

The average particle size of barium ferrite magnetic powder is 50 nm or less, more preferably 10 nm or more and 40 nm or less, and still more preferably 12 nm or more and 25 nm or less.

In a case where the magnetic layer 13 includes barium ferrite magnetic powder as magnetic powder, the average thickness tm [nm] of the magnetic layer 13 preferably satisfies 35 nm≤tm≤100 nm, and is particularly preferably 80 nm or less. Furthermore, the magnetic recording medium 10 has a coercive force Hc of preferably 160 kA/m or more and 280 kA/m or less, more preferably 165 kA/m or more and 275 kA/m or less, still more preferably 170 kA/m or more and 270 kA/m or less when the coercive force Hc is measured in a thickness direction (perpendicular direction) of the magnetic recording medium 10.

(Modification 4) The magnetic powder may include powder of nanoparticles including Co-containing spinel ferrite (hereinafter referred to as "cobalt ferrite particles") instead of the powder of ε iron oxide particles. The cobalt ferrite particle preferably has uniaxial anisotropy. The cobalt ferrite particle has, for example, a cubic shape or a substantially cubic shape. The Co-containing spinel ferrite may further include at least one of Ni, Mn, Al, Cu, and Zn in addition to Co.

The Co-containing spinel ferrite has, for example, an average composition represented by the following formula.

$$Co_xM_yFe_2O_z$$

(Provided that in formula (1), M represents, for example, at least one metal of Ni, Mn, Al, Cu, and Zn). x represents a value within a range of 0.4≤x≤1.0. y represents a value within a range of 0≤y≤0.3. Provided that x and y satisfy a relationship of (x+y)≤1.0. z represents a value within a range of 3≤z≤4. Some of Fe atoms may be replaced with another metal element.)

In a case where the magnetic powder includes powder of cobalt ferrite particles, the average particle size of the magnetic powder is preferably 25 nm or less, and more preferably 10 nm or more and 23 nm or less. When the average particle size of the magnetic powder is 25 nm or less, good electromagnetic conversion characteristics (for example, SNR) can be obtained in the magnetic recording medium 10 having a high recording density. Meanwhile, when the average particle size of the magnetic powder is 10 nm or more, dispersibility of the magnetic powder is further improved, and better electromagnetic conversion characteristics (for example, SNR) can be obtained. In a case where the magnetic powder includes powder of cobalt ferrite particles, the average aspect ratio of the magnetic powder is similar to that of the embodiment described above. Furthermore, a method for calculating the average particle size and the average aspect ratio of the magnetic powder is determined in a similar manner to that of the embodiment described above.

The average particle volume of the magnetic powder is preferably 15000 nm$^3$ or less, and more preferably 1000 nm$^3$ or more and 12000 nm$^3$ or less. When the average particle volume of the magnetic powder is 15000 nm$^3$ or less, a similar effect to that in a case where the average particle size of the magnetic powder is 25 nm or less can be obtained. Meanwhile, when the average particle volume of the magnetic powder is 1000 nm$^3$ or more, a similar effect to a case where the average particle size of the magnetic powder is 10 nm or more can be obtained. Note that a method for calculating the average particle volume of the magnetic powder is similar to the method for calculating the average particle volume of the magnetic powder (the method for calculating the average particle volume in a case where the ε iron oxide particle has a cubic shape or a substantially cubic shape) in the embodiment described above.

The coercive force Hc of cobalt ferrite magnetic powder is preferably 2500 Oe or more, and more preferably 2600 Oe or more and 3500 Oe or less.

(Modification 5)

Figure 6:
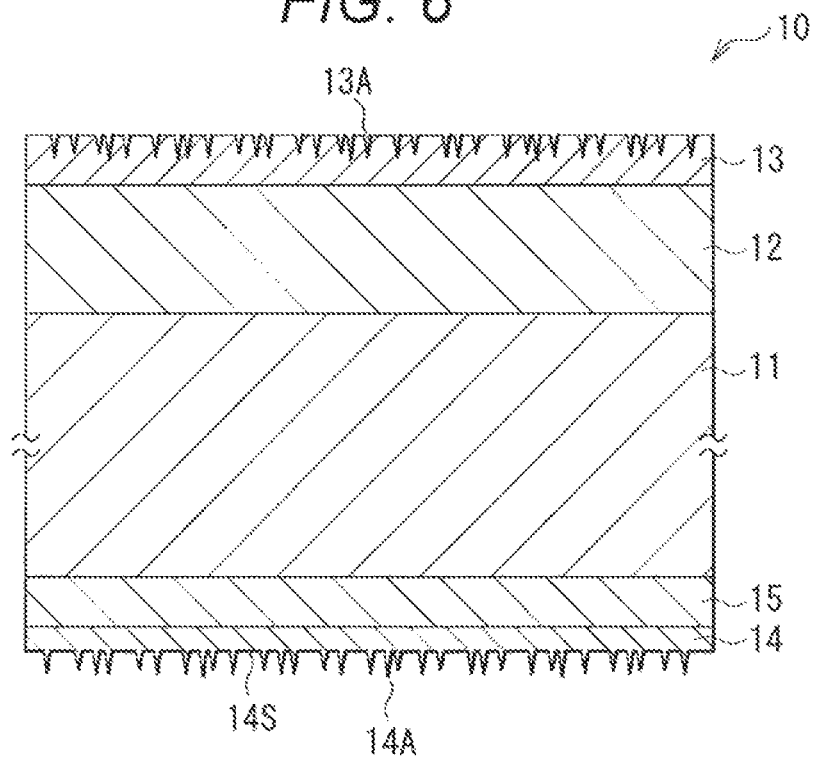
FIG. 6 is a cross-sectional view of a magnetic recording medium as another modification.

The magnetic recording medium 10 may further include a barrier layer 15 disposed on at least one surface of the substrate 11, for example, as illustrated in FIG. 6. The barrier layer 15 is a layer for suppressing a dimensional change according to an environment of the substrate 11. Examples of a cause of the dimensional change include a hygroscopic property of the substrate 11. However, by disposing the barrier layer 15, a penetration rate of moisture into the substrate 11 can be reduced. The barrier layer 15 includes, for example, a metal or a metal oxide. As the metal herein, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, and Ta can be used. As the metal oxide, for example, a metal oxide including one or more of the above metals can be used. More specifically, for example, at least one of $Al_2O_3$, CuO, CoO, $SiO_2$, $Cr_2O_3$, $TiO_2$, $Ta_2O_5$, and $ZrO_2$ can be used. Furthermore, the barrier layer 15 may include diamond-like carbon (DLC), diamond, and the like.

The average thickness of the barrier layer 15 is preferably 20 nm or more and 1000 nm or less, and more preferably 50 nm or more and 1000 nm or less. The average thickness of the barrier layer 15 is determined in a similar manner to the average thickness of the magnetic layer 13. However, a magnification of a TEM image is appropriately adjusted according to the thickness of the barrier layer 15.

(Modification 6)

In the embodiment described above, the case where the large number of holes 13A are formed on the surface 13S of the magnetic layer 13 by transferring the large number of protrusions 14A formed on the surface of the back layer 14 onto the surface 13S of the magnetic layer 13 has been described. However, the method for forming the large number of holes 13A is not limited thereto. For example, the large number of holes 13A may be formed on the surface 13S of the magnetic layer 13 by adjusting the type of a solvent included in the magnetic layer forming coating material, drying conditions of the magnetic layer forming coating material, and the like.

(Modification 7)

The magnetic recording medium 10 according to the embodiment described above may be used for a library device. In this case, the library device may include a plurality of the recording/reproducing devices 30 in the embodiment described above.

EXAMPLES

Hereinafter, the present disclosure will be described specifically with Examples, but the present disclosure is not limited only to these Examples.

In the following Examples and Comparative Examples, the squareness ratio S1 in the perpendicular direction, the squareness ratio S2 in the longitudinal direction, the pore distribution (pore volume and pore diameter of the maximum pore volume during desorption), the BET specific surface area, the average aspect ratio, the average particle size of the magnetic powder, the average particle volume of the magnetic powder, the average thickness of the magnetic layer, the average thickness of the base layer, the average thickness of the back layer, the average thickness of the substrate, and the arithmetic average roughness of the surface of the magnetic layer are values determined by the measurement method described in the embodiment described above.

Example 1

A magnetic recording medium as Example 1 was obtained as follows.

<Step of Preparing Magnetic Layer Forming Coating Material>

A magnetic layer forming coating material was prepared as follows. First, a first composition having the following formulation was kneaded with an extruder. Next, the kneaded first composition and a second composition having the following formulation were added to a stirring tank equipped with a disper, and were premixed. Subsequently, the mixture was further subjected to sand mill mixing, and was subjected to a filter treatment to prepare a magnetic layer forming coating material.

(First Composition)

Each component and weight in the first composition are as follows.

Powder of barium ferrite ($BaFe_{12}O_{19}$) particles (hexagonal plate shape, average aspect ratio 2.8, average particle volume 1950 $nm^3$): 100 parts by mass Vinyl chloride-based resin (cyclohexanone solution 30% by mass): 42 parts by mass (including a solvent) (Degree of polymerization: 300, Mn=10000, $OSO_3K$=0.07 mmol/g and secondary OH=0.3 mmol/g were included as polar groups.)

Aluminum oxide powder: 5 parts by mass ($\alpha$-$Al_2O_3$, average particle diameter 0.1 μm)

Carbon black (manufactured by Tokai Carbon Co., Ltd., trade name: Seast TA): 2 parts by mass (Second Composition)

Each component and weight in the second composition are as follows.

Vinyl chloride-based resin: 3 parts by mass (including a solvent)

(Resin solution: resin content 30% by mass, cyclohexanone 70% by mass)

n-Butyl stearate: 2 parts by mass

Methyl ethyl ketone: 121.3 parts by mass

Toluene: 121.3 parts by mass

Cyclohexanone: 60.7 parts by mass

To the magnetic layer forming coating material prepared as described above, 4 parts by mass of polyisocyanate (trade name: Coronate L, manufactured by Tosoh Corporation) as a curing agent and 2 parts by mass of stearic acid as a fatty acid of a lubricant were added.

<Step of Preparing Base Layer Forming Coating Material>

A base layer forming coating material was prepared as follows. First, a third composition having the following formulation was kneaded with an extruder. Next, the kneaded third composition and a fourth composition having the following formulation were added to a stirring tank equipped with a disper, and were premixed. Subsequently, the mixture was further subjected to sand mill mixing, and was subjected to a filter treatment to prepare a base layer forming coating material.

(Third Composition)

Each component and weight in the third composition are as follows.

Acicular iron oxide powder ($\alpha$-$Fe_2O_3$, average major axis length 0.15 μm): 100 parts by mass Vinyl chloride-based resin: 60.6 parts by mass (including a solvent)

(Resin solution: resin content 30% by mass, cyclohexanone 70% by mass)

Carbon black (average particle diameter 20 nm): 10 parts by mass (Fourth Composition)

Each component and weight in the fourth composition are as follows.

Polyurethane-based resin UR8200 (manufactured by Toyobo Co., Ltd.): 18.5 parts by mass n-Butyl stearate: 2 parts by mass Methyl ethyl ketone: 108.2 parts by mass Toluene: 108.2 parts by mass Cyclohexanone: 18.5 parts by mass To the base layer forming coating material prepared as described above, 4 parts by mass of polyisocyanate (trade name: Coronate L, manufactured by Tosoh Corporation) as a curing agent and 2 parts by mass of stearic acid as a fatty acid of a lubricant were added.

<Step of Preparing Back Layer Forming Coating Material>

A back layer forming coating material was prepared as follows. The following raw materials were mixed in a stirring tank equipped with a disper, and were subjected to filter treatment to prepare a back layer forming coating material.

- Carbon black powder having a small particle diameter (average particle diameter (D50) 20 nm): 90 parts by mass
- Carbon black powder having a large particle diameter (average particle diameter (D50) 270 nm): 10 parts by mass
- Polyester polyurethane (manufactured by Tosoh Corporation, trade name: N-2304): 100 parts by mass
- Methyl ethyl ketone: 500 parts by mass
- Toluene: 400 parts by mass
- Cyclohexanone: 100 parts by mass <Application Step>

Using the magnetic layer forming coating material and the base layer forming coating material prepared as described above, a base layer and a magnetic layer were formed on one main surface of a long polyester film having an average thickness of 4.0 µm as a nonmagnetic support such that the average thickness of the base layer was 0.6 µm and the average thickness of the magnetic layer was 80 nm after calendering as follows. First, the base layer forming coating material was applied onto one main surface of the polyester film and dried to form a base layer. Next, the magnetic layer forming coating material was applied onto the base layer and dried to form a magnetic layer. Note that the magnetic powder was subjected to magnetic field orientation in a thickness direction of the film by a solenoid coil when the magnetic layer forming coating material was dried. Furthermore, drying conditions (drying temperature and drying time) of the magnetic layer forming coating material were adjusted, and the squareness ratio S1 of the magnetic recording medium in the thickness direction (perpendicular direction) and the squareness ratio S2 thereof in the longitudinal direction were set to the values illustrated in Table 2 illustrated below. Subsequently, the back layer forming coating material was applied onto the other main surface of the polyester film, dried, and calendered to form a back layer having an average thickness of 0.3 µm. As a result, a magnetic recording medium was obtained.

<Calendering Step and Transfer Step>

Subsequently, calendering was performed to smooth a surface of the magnetic layer. Next, the magnetic recording medium having a smooth surface of the magnetic layer was wound into a roll shape, and then the magnetic recording medium was heated at 60° C. for 10 hours in this state. Then, the magnetic recording medium was rewound in a roll shape such that an end located on an inner circumferential side was located on an outer circumferential side oppositely, and then the magnetic recording medium was heated again at 60° C. for 10 hours in this state. As a result, a large number of protrusions on the surface of the back layer were transferred onto the surface of the magnetic layer to form a large number of holes on the surface of the magnetic layer.

<Cutting Step>

The magnetic recording medium obtained as described above was cut into a width of ½ inches (12.65 mm). As a result, the target long magnetic recording medium (average thickness 5.6 µm) was obtained. Note that the BET specific surface area of the obtained magnetic recording medium was 4 m$^2$/g in a state where the lubricant has been removed from the magnetic recording medium and the magnetic recording medium has been dried.

Example 2

A magnetic recording medium as Example 2 was obtained in a similar manner to Example 1 described above except that the average thickness of the base layer was set to 0.8 µm.

Examples 3 to 5

Magnetic recording media as Examples 3 to 5 were obtained in a similar manner to Example 1 described above except that the drying conditions were adjusted in the application step, and the squareness ratio S1 of the magnetic recording medium in the thickness direction (perpendicular direction) and the squareness ratio S2 thereof in the longitudinal direction were set to the values illustrated in Table 2.

Example 6

The average thickness of the base layer was set to 0.9 µm, the average thickness of the back layer was set to 0.4 µm, and the average thickness of the substrate was set to 4.2 µm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. Moreover, the heating conditions were adjusted in the transfer step, and the BET specific surface area was set to 4.5 m$^2$/g. A magnetic recording medium as Example 6 was obtained in a similar manner to Example 1 described above except for these.

Example 7

The average thickness of the base layer was set to 0.7 µm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. Moreover, the heating conditions were adjusted in the transfer step, and the BET specific surface area was set to 5.0 m$^2$/g. A magnetic recording medium as Example 7 was obtained in a similar manner to Example 1 described above except for these.

Example 8

In the step of preparing the magnetic layer forming coating material, powder of strontium ferrite particles (hexagonal plate shape, average aspect ratio 3.0, average particle size 21.3 nm, particle volume 2000 nm$^3$) was used as the magnetic powder. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 8 was obtained in a similar manner to Example 1 described above except for these.

Example 9

In the step of preparing the magnetic layer forming coating material, powder of ε iron oxide particles (spherical shape, average aspect ratio 1.1, average particle size 16 nm, particle volume 2150 nm$^3$) was used as the magnetic powder. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 9 was obtained in a similar manner to Example 1 described above except for these.

Example 10

In the step of preparing the magnetic layer forming coating material, cobalt ferrite powder (cubic shape, average aspect ratio 1.7, average particle size 18.5 nm, particle volume 2200 nm$^3$) was used as the magnetic powder. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 10 was obtained in a similar manner to Example 1 described above except for these.

Example 11

The average thickness of the base layer was set to 0.9 μm, the average thickness of the back layer was set to 0.4 μm, and the average thickness of the substrate was set to 4.2 μm. Furthermore, in the back layer forming coating material, the blending amount of carbon black powder having a small particle diameter (average particle diameter (D50) 20 nm) was set to 80 parts by mass, and the blending amount of carbon black powder having a large particle diameter (average particle diameter (D50) 270 nm) was set to 20 parts by mass. Furthermore, the heating conditions were adjusted in the transfer step, the pore volume was set to 0.023 cm$^3$/g, and the pore diameter of the maximum pore volume at the time of desorption was set to 9 nm. Moreover, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 11 was obtained in a similar manner to Example 1 described above except for these.

Example 12

The average thickness of the base layer was set to 0.9 μm, the average thickness of the back layer was set to 0.4 μm, and the average thickness of the substrate was set to 4.2 μm. Furthermore, the heating conditions were adjusted in the transfer step, and the pore diameter of the maximum pore volume at the time of desorption was set to 10 nm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 12 was obtained in a similar manner to Example 1 described above except for these.

Example 13

The average thickness of the back layer was set to 0.5 μm, and the average thickness of the substrate was set to 3.6 μm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 13 was obtained in a similar manner to Example 1 described above except for these.

Example 14

In forming the back layer forming coating material, 70 parts by mass of carbon black powder having a small particle diameter (average particle diameter (D50) 50 nm) was blended instead of carbon black powder having a small particle diameter (average particle diameter (D50) 20 nm), and the blending amount of carbon black powder having a large particle diameter (average particle diameter (D50) 270 nm) was set to 30 parts by mass. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. Moreover, the heating conditions were adjusted in the transfer step, and the BET specific surface area was set to 6.0 m$^2$/g. A magnetic recording medium as Example 16 was obtained in a similar manner to Example 1 described above except for these. Note that the pore diameter of the maximum pore volume at the time of desorption was 12 nm.

Example 15

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 17 was obtained in a similar manner to Example 1 described above except for these.

Example 16

The average thickness of the base layer was set to 0.9 μm, the average thickness of the back layer was set to 0.4 μm, and the average thickness of the substrate was set to 4.2 μm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 18 was obtained in a similar manner to Example 1 described above except for these. Note that the BET specific surface area was 3.9 m$^2$/g.

Example 17

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 19 was obtained in a similar manner to Example 1 described above except for these. Note that the BET specific surface area was 3.8 m$^2$/g.

Example 18

A magnetic recording medium as Example 20 was obtained in a similar manner to Example 1 described above except that powder of hexagonal plate-shaped barium ferrite particles having an average aspect ratio of 2.5, an average particle size of 19.0 nm, and an average particle volume of 1600 nm$^3$ was used as the magnetic powder in the step of preparing the magnetic layer forming coating material. Note that the pore diameter of the maximum pore volume at the time of desorption was 7 nm.

Example 19

A magnetic recording medium as Example 21 was obtained in a similar manner to Example 1 described above except that powder of hexagonal plate-shaped barium ferrite particles having an average aspect ratio of 2.3, an average particle size of 17.0 nm, and an average particle volume of 1300 nm$^3$ was used as the magnetic powder in the step of preparing the magnetic layer forming coating material. Note that the pore diameter of the maximum pore volume at the time of desorption was 6 nm.

Example 20

The average thickness of the magnetic layer was set to 60 nm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 22 was obtained in a similar manner to Example 1 described above except for these. Note that the BET specific surface area was 3.9 m$^2$/g.

Example 21

The average thickness of the magnetic layer was set to 40 nm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. A magnetic recording medium as Example 23 was obtained in a similar manner to Example 1 described above except for these. Note that the BET specific surface area was 3.8 m$^2$/g.

Example 22

In the step of preparing the magnetic layer forming coating material, powder of hexagonal plate-shaped barium ferrite particles having an average particle size of 23.0 nm and an average particle volume of 2500 nm$^3$ was used as the magnetic powder. Furthermore, the average thickness of the base layer was set to 0.5 μm. A magnetic recording medium as Example 24 was obtained in a similar manner to Example 1 described above except for these.

Example 23

A magnetic recording medium as Example 25 was obtained in a similar manner to Example 1 described above except that powder of hexagonal plate-shaped barium ferrite particles having an average particle size of 23.0 nm and an average particle volume of 2500 nm$^3$ was used as the magnetic powder in the step of preparing the magnetic layer forming coating material.

Example 24

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. Moreover, the heating conditions were adjusted in the transfer step, and the BET specific surface area was set to 3.5 m$^2$/g. A magnetic recording medium as Example 26 was obtained in a similar manner to Example 1 described above except for these.

Comparative Example 1

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, and the BET specific surface area was set to 3.0 m$^2$/g. A magnetic recording medium as Comparative Example 1 was obtained in a similar manner to Example 1 described above except for these.

Comparative Example 2

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Furthermore, the average thickness of the base layer was set to 1.2 μm. A magnetic recording medium as Comparative Example 2 was obtained in a similar manner to Example 1 described above except for these.

Comparative Example 3

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Furthermore, the average thickness of the base layer was set to 1.2 μm. Moreover, the heating conditions were adjusted in the transfer step, and the BET specific surface area was set to 2.0 m$^2$/g. A magnetic recording medium as Comparative Example 3 was obtained in a similar manner to Example 1 described above except for these.

Comparative Example 4

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, and the BET specific surface area was set to 2.0 m$^2$/g. A magnetic recording medium as Comparative Example 4 was obtained in a similar manner to Example 1 described above except for these.

Comparative Example 5

In forming the back layer forming coating material, 80 parts by mass of carbon black powder having a small particle diameter (average particle diameter (D50) 50 nm) was blended instead of carbon black powder having a small particle diameter (average particle diameter (D50) 20 nm), and the blending amount of carbon black powder having a large particle diameter (average particle diameter (D50) 270 nm) was set to 20 parts by mass. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, the pore volume was set to 0.018 cm$^3$/g, and the BET specific surface area was set to 3.0 m$^2$/g. A magnetic recording medium as Comparative Example 5 was obtained in a similar manner to Example 1 described above except for these.

Comparative Example 6

In forming the back layer forming coating material, 90 parts by mass of carbon black powder having a small particle diameter (average particle diameter (D50) 50 nm) was blended instead of carbon black powder having a small particle diameter (average particle diameter (D50) 20 nm). Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, the pore volume was set to 0.015 cm$^3$/g, and the BET specific surface area was set to 2.5 m$^2$/g. A magnetic recording medium as Comparative Example 6 was obtained in a similar manner to Example 1 described above except for these.

Comparative Example 7

In forming the back layer forming coating material, 100 parts by mass of carbon black powder having a small particle diameter (average particle diameter (D50) 20 nm) was blended, and the blending amount of carbon black powder having a large particle diameter (average particle diameter (D50) 270 nm) was set to 0 parts by mass. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, the pore volume was set to 0.015 cm$^3$/g, the pore diameter of the maximum pore volume at the time of desorption was set to 5 nm, and the BET specific surface area was set to 2.0 m$^2$/g. A magnetic recording medium as Comparative Example 7 was obtained in a similar manner to Example 1 described above except for these.

Comparative Example 8

In forming the back layer forming coating material, 100 parts by mass of carbon black powder having a small particle diameter (average particle diameter (D50) 20 nm) was blended, and the blending amount of carbon black powder having a large particle diameter (average particle diameter (D50) 270 nm) was set to 0 parts by mass. Furthermore, the average thickness of the base layer was set to 0.5 µm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, the pore volume was set to 0.015 cm$^3$/g, the pore diameter of the maximum pore volume at the time of desorption was set to 5 nm, and the BET specific surface area was set to 2.0 m$^2$/g. A magnetic recording medium as Comparative Example 7 was obtained in a similar manner to Example 1 described above except for these.

Comparative Example 9

The average thickness of the base layer was set to 1.0 µm, and the average thickness of the back layer was set to 0.5 µm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, and the BET specific surface area was set to 3.8 m$^2$/g. A magnetic recording medium as Comparative Example 9 was obtained in a similar manner to Example 1 described above except for these.

Comparative Example 10

The average thickness of the base layer was set to 1.4 µm. Furthermore, in the application step, drying conditions were adjusted, and the squareness ratio S1 of the magnetic recording medium in the thickness direction (perpendicular direction) and the squareness ratio S2 thereof in the longitudinal direction were set to the values illustrated in Table 3. Moreover, the heating conditions were adjusted in the transfer step, and the BET specific surface area was set to 3.5 m$^2$/g. A magnetic recording medium as Comparative Example 10 was obtained in a similar manner to Example 1 described above except for these.

Comparative Examples 11 and 12

In the application step, drying conditions were adjusted, and the squareness ratio S1 of the magnetic recording medium in the thickness direction (perpendicular direction) and the squareness ratio S2 thereof in the longitudinal direction were set to the values illustrated in Table 2. Magnetic recording media as Comparative Examples 11 and 12 were obtained in a similar manner to Example 1 described above except for these.

[Evaluation]

For the magnetic recording media of Examples 1 to 26 and Comparative Examples 1 to 10 obtained as described above, the following evaluation was performed in addition to the above-described friction coefficient ratio ($\mu_B/\mu_A$) and friction coefficient ratio ($\mu C_{(1000)}/\mu C_{(5)}$).

(SNR)

Using a ½ inch tape traveling device (manufactured by Mountain Engineering II, MTS Transport) equipped with a recording/reproducing head and a recording/reproducing amplifier, the electromagnetic conversion characteristics (SNR) of each of the magnetic recording media were measured in an environment of 25° C. A ring head having a gap length of 0.2 μm was used as the recording head, and a GMR head having a shield-to-shield distance of 0.1 μm was used as the reproducing head. A relative speed, a recording clock frequency, and a recording track width were set to 6 m/s, 160 MHz, and 2.0 μm, respectively. Furthermore, the SNR was calculated on the basis of a method described in the following document. The results are illustrated in Table 2 as relative values with the SNR of Example 1 as 1 dB.

Y Okazaki: "An Error Rate Emulation System.", IEEE Trans. Man., 31, pp. 3093-3095 (1995)

Table 2 summarizes the configurations and evaluation results of the magnetic recording media in Examples and Comparative Examples.

TABLE 2

| | Substrate | Squareness ratio in perpendicular direction (no demagnetizing field correction) [%] | Squareness ratio in longitudinal direction [%] | Pore volume [cm³/g] | Pore diameter in maximum pore volume at the time of desorption [nm] | BET specific surface area (m²/g) | Magnetic powder | Friction coefficient ratio (μB/μA) | Friction coefficient ratio (μC (1000)/ μC(5)) | SNR characteristics | Young's modulus MD Gpa |
|---|---|---|---|---|---|---|---|---|---|---|---|
| Example 1 | Polyester | 65 | 35 | 0.020 | 8 | 4 | BaFe$_{12}$O$_{19}$ | 1.3 | 1.3 | 1 | 7.48 |
| Example 2 | Polyester | 65 | 35 | 0.020 | 8 | 4 | BaFe$_{12}$O$_{19}$ | 1.4 | 1.4 | 1 | 7.65 |
| Example 3 | Polyester | 66 | 30 | 0.020 | 8 | 4 | BaFe$_{12}$O$_{19}$ | 1.3 | 1.4 | 1.2 | 7.48 |
| Example 4 | Polyester | 71 | 29 | 0.020 | 8 | 4 | BaFe$_{12}$O$_{19}$ | 1.3 | 1.3 | 1.4 | 7.48 |
| Example 5 | Polyester | 70 | 25 | 0.020 | 8 | 4 | BaFe$_{12}$O$_{19}$ | 1.2 | 1.3 | 1.5 | 7.48 |
| Example 6 | Polyester | 66 | 30 | 0.020 | 8 | 4.5 | BaFe$_{12}$O$_{19}$ | 1.3 | 1.3 | 1.1 | 7.76 |
| Example 7 | Polyester | 66 | 30 | 0.020 | 8 | 5 | BaFe$_{12}$O$_{19}$ | 1.3 | 1.3 | 1.1 | 7.57 |
| Example 8 | Polyester | 66 | 30 | 0.020 | 8 | 4 | SrFe$_{12}$O$_{19}$ | 1.3 | 1.3 | 1.1 | 7.48 |
| Example 9 | Polyester | 66 | 30 | 0.020 | 8 | 4 | ε iron oxide | 1.3 | 1.4 | 1.2 | 7.48 |
| Example 10 | Polyester | 66 | 30 | 0.020 | 8 | 4 | Co-iron oxide | 1.3 | 1.3 | 1.3 | 7.48 |
| Example 11 | Polyester | 66 | 30 | 0.023 | 9 | 4 | BaFe$_{12}$O$_{19}$ | 1.2 | 1.2 | 1.2 | 7.76 |
| Example 12 | Polyester | 66 | 30 | 0.020 | 10 | 4 | BaFe$_{12}$O$_{19}$ | 1.2 | 1.2 | 1.2 | 7.76 |
| Example 13 | Polyester | 70 | 25 | 0.020 | 8 | 4 | BaFe$_{12}$O$_{19}$ | 1.8 | 1.8 | 1.5 | 7.76 |
| Example 14 | Polyester | 66 | 31 | 0.020 | 12 | 6 | BaFe$_{12}$O$_{19}$ | 1.8 | 1.8 | 1.1 | 7.50 |
| Example 15 | Polyester | 75 | 23 | 0.020 | 8 | 4 | BaFe$_{12}$O$_{19}$ | 1.3 | 1.3 | 1.6 | 7.48 |
| Example 16 | Polyester | 80 | 21 | 0.020 | 8 | 3.9 | BaFe$_{12}$O$_{19}$ | 1.2 | 1.3 | 1.9 | 7.48 |
| Example 17 | Polyester | 85 | 18 | 0.020 | 8 | 3.8 | BaFe$_{12}$O$_{19}$ | 1.3 | 1.3 | 2.2 | 7.76 |
| Example 18 | Polyester | 65 | 35 | 0.020 | 7 | 4 | BaFe$_{12}$O$_{19}$ | 1.3 | 1.3 | 1.8 | 7.48 |
| Example 19 | Polyester | 65 | 35 | 0.020 | 6 | 4 | BaFe$_{12}$O$_{19}$ | 1.3 | 1.5 | 2.2 | 7.48 |
| Example 20 | Polyester | 75 | 23 | 0.020 | 8 | 3.9 | BaFe$_{12}$O$_{19}$ | 1.5 | 1.6 | 1.6 | 7.46 |
| Example 21 | Polyester | 80 | 20 | 0.020 | 8 | 3.8 | BaFe$_{12}$O$_{19}$ | 1.7 | 1.7 | 1.6 | 7.45 |
| Example 22 | Polyester | 65 | 35 | 0.020 | 8 | 4 | BaFe$_{12}$O$_{19}$ | 1.5 | 1.5 | 1.0 | 7.48 |
| Example 23 | Polyester | 65 | 35 | 0.020 | 8 | 4 | BaFe$_{12}$O$_{19}$ | 1.4 | 1.5 | 1.0 | 7.48 |
| Example 24 | Polyester | 66 | 31 | 0.020 | 8 | 3.5 | BaFe$_{12}$O$_{19}$ | 1.8 | 1.7 | 1.2 | 7.48 |
| Comparative Example 1 | Polyester | 66 | 31 | 0.020 | 8 | 3 | BaFe$_{12}$O$_{19}$ | 2.1 | 2 | 1 | 7.48 |
| Comparative Example 2 | Polyester | 66 | 31 | 0.020 | 8 | 4 | BaFe$_{12}$O$_{19}$ | 2.5 | 2.4 | 1 | 7.96 |
| Comparative Example 3 | Polyester | 66 | 31 | 0.020 | 8 | 2 | BaFe$_{12}$O$_{19}$ | 2.1 | 2.1 | 1 | 7.96 |
| Comparative Example 4 | Polyester | 66 | 31 | 0.020 | 8 | 2 | BaFe$_{12}$O$_{19}$ | 2.3 | 2.5 | 1.1 | 7.48 |
| Comparative Example 5 | Polyester | 66 | 31 | 0.020 | 8 | 3 | BaFe$_{12}$O$_{19}$ | 2.2 | 2.3 | 1 | 7.48 |
| Comparative Example 6 | Polyester | 66 | 31 | 0.015 | 8 | 2.5 | BaFe$_{12}$O$_{19}$ | 2.3 | 2.5 | 1.1 | 7.48 |
| Comparative Example 7 | Polyester | 66 | 31 | 0.015 | 5 | 2 | BaFe$_{12}$O$_{19}$ | 2.4 | 2.6 | 1 | 7.48 |
| Comparative Example 8 | Polyester | 66 | 31 | 0.015 | 5 | 2 | BaFe$_{12}$O$_{19}$ | 2.6 | 2.7 | 1 | 7.39 |
| Comparative Example 9 | Polyester | 66 | 30 | 0.020 | 8 | 3.8 | BaFe$_{12}$O$_{19}$ | 2.1 | 2 | 1.1 | 7.97 |
| Comparative Example 10 | Polyester | 66 | 30 | 0.020 | 8 | 3.5 | BaFe$_{12}$O$_{19}$ | 2.5 | 2.3 | 1.1 | 8.11 |
| Comparative Example 11 | Polyester | 55 | 46 | 0.020 | 8 | 4 | BaFe$_{12}$O$_{19}$ | 1.3 | 1.3 | 0.1 | 7.48 |
| Comparative Example 12 | Polyester | 61 | 40 | 0.020 | 8 | 4 | BaFe$_{12}$O$_{19}$ | 1.3 | 1.2 | 0.2 | 7.48 |

| | Shape | Average aspect ratio | Particle volume [nm³] | Average particle size [nm] | Average thickness of magnetic layer [nm] | Average thickness of lower layer [nm] | Thickness of base [μm] | Average thickness of tape [μm] | Ra of magnetic layer [nm] |
|---|---|---|---|---|---|---|---|---|---|
| Example 1 | Plate shape | 2.8 | 1950 | 20.3 | 80 | 0.6 | 4 | 1.0 | 1.7 |
| Example 2 | Plate shape | 2.8 | 1950 | 20.3 | 80 | 0.8 | 4 | 1.2 | 1.7 |
| Example 3 | Plate shape | 2.8 | 1950 | 20.3 | 80 | 0.6 | 4 | 1.0 | 1.7 |

TABLE 2-continued

| | | | | | | | | | |
|---|---|---|---|---|---|---|---|---|---|
| Example 4 | Plate shape | 2.8 | 1950 | 20.3 | 80 | 0.6 | 4 | 1.0 | 1.6 |
| Example 5 | Plate shape | 2.8 | 1950 | 20.3 | 80 | 0.6 | 4 | 1.0 | 1.6 |
| Example 6 | Plate shape | 2.8 | 1950 | 20.3 | 80 | 0.9 | 4.2 | 1.4 | 1.7 |
| Example 7 | Plate shape | 2.8 | 1950 | 20.3 | 80 | 0.7 | 4 | 1.1 | 1.8 |
| Example 8 | Plate shape | 3.0 | 2000 | 21.3 | 80 | 0.6 | 4 | 1.0 | 1.7 |
| Example 9 | Spherical shape | 1.1 | 2150 | 16 | 80 | 0.6 | 4 | 1.0 | 1.7 |
| Example 10 | Cubic shape | 1.7 | 2200 | 18.5 | 80 | 0.6 | 4 | 1.0 | 1.7 |
| Example 11 | Plate shape | 2.8 | 1950 | 20.3 | 80 | 0.9 | 4.2 | 1.4 | 1.7 |
| Example 12 | Plate shape | 2.8 | 1950 | 20.3 | 80 | 0.9 | 4.2 | 1.4 | 1.7 |
| Example 13 | Plate shape | 2.8 | 1950 | 20.3 | 80 | 0.6 | 3.6 | 1.2 | 1.6 |
| Example 14 | Plate shape | 2.8 | 1950 | 20.3 | 80 | 0.6 | 4 | 1.0 | 2 |
| Example 15 | Plate shape | 2.8 | 1950 | 20.3 | 80 | 0.6 | 4 | 1.0 | 1.7 |
| Example 16 | Plate shape | 2.8 | 1950 | 20.3 | 80 | 0.6 | 4 | 1.0 | 1.7 |
| Example 17 | Plate shape | 2.8 | 1950 | 20.3 | 80 | 0.9 | 4.2 | 1.4 | 1.7 |
| Example 18 | Plate shape | 2.5 | 1950 | 20.3 | 80 | 0.6 | 4 | 1.0 | 1.7 |
| Example 19 | Plate shape | 2.3 | 1600 | 19 | 80 | 0.6 | 4 | 1.0 | 1.6 |
| Example 20 | Plate shape | 2.8 | 1300 | 17 | 60 | 0.6 | 4 | 1.0 | 1.6 |
| Example 21 | Plate shape | 2.8 | 1950 | 20.3 | 40 | 0.6 | 4 | 0.9 | 1.6 |
| Example 22 | Plate shape | 2.8 | 1950 | 25 | 80 | 0.6 | 4 | 1.0 | 1.8 |
| Example 23 | Plate shape | 2.8 | 2500 | 23 | 80 | 0.6 | 4 | 1.0 | 1.7 |
| Example 24 | Plate shape | 2.8 | 1950 | 23 | 80 | 0.6 | 4 | 1.0 | 1.7 |
| Comparative Example 1 | Plate shape | 2.8 | 1950 | 20.3 | 80 | 0.6 | 4 | 1.0 | 1.7 |
| Comparative Example 2 | Plate shape | 2.8 | 1950 | 20.3 | 80 | 1.2 | 4 | 1.6 | 1.7 |
| Comparative Example 3 | Plate shape | 2.8 | 1950 | 20.3 | 80 | 1.2 | 4 | 1.6 | 1.7 |
| Comparative Example 4 | Plate shape | 2.8 | 1950 | 20.3 | 80 | 0.6 | 4 | 1.0 | 1.7 |
| Comparative Example 5 | Plate shape | 2.8 | 1950 | 20.3 | 80 | 0.6 | 4 | 1.0 | 1.7 |
| Comparative Example 6 | Plate shape | 2.8 | 1950 | 20.3 | 80 | 0.6 | 4 | 1.0 | 1.7 |
| Comparative Example 7 | Plate shape | 2.8 | 1950 | 20.3 | 80 | 0.6 | 4 | 1.0 | 1.6 |
| Comparative Example 8 | Plate shape | 2.8 | 1950 | 20.3 | 80 | 0.5 | 4 | 0.9 | 1.6 |
| Comparative Example 9 | Plate shape | 2.8 | 1950 | 20.3 | 80 | 1 | 4 | 5.6 | 1.7 |
| Comparative Example 10 | Plate shape | 2.8 | 1950 | 20.3 | 80 | 1.4 | 4 | 5.8 | 1.7 |
| Comparative Example 11 | Plate shape | 2.8 | 1950 | 20.3 | 80 | 0.6 | 4 | 1.0 | 1.7 |
| Comparative Example 12 | Plate shape | 2.8 | 1950 | 20.3 | 80 | 0.6 | 4 | 1.0 | 1.7 |

As illustrated in Table 2, in Examples 1 to 24, since the BET specific surface area of the entire magnetic recording medium in a state where the lubricant had been removed from the magnetic recording medium and the magnetic recording medium had been dried was 3.5 m²/g or more, even after repeated recording or reproduction was performed, the lubricant was stably supplied to an interface between the magnetic recording medium and the magnetic head, and an increase in the friction coefficient ratio could be suppressed. Meanwhile, in Comparative Examples 1 and 3 to 8, since the BET specific surface area of the entire magnetic recording medium in a state where the lubricant had been removed from the magnetic recording medium and the magnetic recording medium had been dried was less than 3.5 m²/g, the friction coefficient ratio increased after repeated recording or reproduction was performed.

Furthermore, in Comparative Examples 2, 9, and 10, the BET specific surface area of the entire magnetic recording medium in a state where the lubricant had been removed from the magnetic recording medium and the magnetic recording medium had been dried was 3.5 m²/g or more, but the average thickness of the base layer was more than 0.9 µm. Therefore, the Young's modulus was high, and the friction coefficient ratio increased after repeated recording or reproduction was performed.

Furthermore, in Examples 1 to 24, since the squareness ratio S1 of the magnetic recording medium in a perpendicular direction (thickness direction) thereof was 65% or more, a good SNR was obtained. Meanwhile, in Comparative Examples 11 and 12, since the squareness ratio S1 in the perpendicular direction (thickness direction) of the magnetic recording medium was less than 65%, an SNR deteriorated.

Although the present disclosure has been specifically described with reference to the embodiment and Modifications thereof, the present disclosure is not limited to the above-described embodiment and the like, and various modifications can be made.

For example, the configurations, the methods, the steps, the shapes, the materials, the numerical values, and the like exemplified in the embodiment described above and Modifications thereof are only examples, and a configuration, a method, a step, a shape, a material, a numerical value, and the like different therefrom may be used as necessary. Specifically, the magnetic recording medium of the present disclosure may include components other than the substrate, the base layer, the magnetic layer, the back layer, and the barrier layer. Furthermore, the chemical formulas of the compounds and the like are representative and are not limited to the described valences and the like as long as the compounds have common names of the same compound.

Furthermore, the configurations, the methods, the steps, the shapes, the materials, the numerical values, and the like in the embodiment described above and Modifications thereof can be combined to each other as long as not departing from the gist of the present disclosure.

Furthermore, within the numerical range described step by step here, an upper limit value or a lower limit value of a numerical range in one stage may be replaced with an upper limit value or a lower limit value of a numerical range in another stage. The materials exemplified here can be used singly or in combination of two or more thereof unless otherwise specified.

As described above, the magnetic recording medium according to an embodiment of the present disclosure can exhibit good traveling performance during use.

Note that the effect of the present disclosure is not limited thereto, and may be any effect described here. Furthermore, the present technology can take the following configurations.

(1)
A tape-shaped magnetic recording medium including:
a substrate;
a base layer disposed on the substrate; and
a magnetic layer disposed on the base layer, in which
the substrate includes a polyester as a main component,
the base layer has an average thickness of 0.9 μm or less,
the base layer and the magnetic layer each include a lubricant,
the magnetic layer has a surface having a large number of holes, and the surface has arithmetic average roughness Ra of 2.5 nm or less,
the entire magnetic recording medium has a BET specific surface area of 3.5 m²/g or more in a state where the lubricant has been removed from the magnetic recording medium and the magnetic recording medium has been dried,
a squareness ratio in a perpendicular direction is 65% or more,
the magnetic layer has an average thickness of 90 nm or less, and
the magnetic recording medium has an average thickness of 5.6 μm or less.

(2)
The magnetic recording medium according to (1) described above, in which
the magnetic recording medium has Young's modulus of 7.78 GPa or less.

(3)
The magnetic recording medium according to (1) or (2) described above, in which
the substrate has an average thickness of 4.2 μm or less.

(4)
The magnetic recording medium according to any one of (1) to (3) described above, further including
a back layer disposed on a side of the substrate opposite to the base layer, in which the back layer has an average thickness of 0.3 μm or more and 0.5 μm or less.

(5)
The magnetic recording medium according to any one of (1) to (4) described above, in which
the base layer has an average thickness of 0.5 μm or more.

(6)
The magnetic recording medium according to any one of (1) to (5) described above, in which
the entire magnetic recording medium has an average pore diameter of 6 nm or more and 12 nm or less, the average pore diameter being determined by a BJH method.

(7)
The magnetic recording medium according to any one of (1) to (6) described above, in which
in a case where a coefficient of dynamic friction between the surface and a magnetic head is represented by μA when a tension of 0.4 N is applied to the magnetic recording medium, and a coefficient of dynamic friction between the surface and the magnetic head is represented by μB when a tension of 1.2 N is applied to the magnetic recording medium, a friction coefficient ratio μB/μA is 1.0 or more and 1.8 or less.

(8)
The magnetic recording medium according to any one of (1) to (7) described above, in which
in a case where a fifth coefficient of dynamic friction between the surface and a magnetic head from the start of travel of the magnetic recording medium is represented by μC(5) when a tension of 0.6 N is applied to the magnetic recording medium, and a 1000th coefficient of dynamic friction between the surface and the magnetic head from the start of travel of the magnetic recording medium is represented by μC(1000) when a tension of 0.6 N is applied to the magnetic recording medium, a friction coefficient ratio μC(1000)/μC(5) is 1.2 or more and 1.8 or less.

(9)
The magnetic recording medium according to any one of (1) to (8) described above, in which
the magnetic layer includes magnetic powder, and
the magnetic powder has an average aspect ratio of 1.1 or more and 3.0 or less.

(10)
The magnetic recording medium according to any one of (1) to (9) described above, in which
the magnetic layer includes magnetic powder, and
the magnetic powder includes hexagonal ferrite including at least one of barium (Ba) and strontium (Sr), ε iron oxide, or cobalt (Co)-containing spinel type ferrite.

(11)
The magnetic recording medium according to any one of (1) to (10) described above, in which
the magnetic layer includes magnetic powder, and
the magnetic powder has an average particle size of 25 nm or less.

(12)
The magnetic recording medium according to any one of (1) to (11) described above, in which
the lubricant includes at least one of compounds represented by the following general formulas <1> to <4>.

$$CH_3(CH_2)_nCOOH \qquad <1>$$

(Provided that in the general formula <1>, n is an integer selected from a range of 14 or more and 22 or less.)

$$CH_3(CH_2)_pCOO(CH_2)_qCH_3 \qquad <2>$$

(Provided that in the general formula <2>, p is an integer selected from a range of 14 or more and 22 or less, and q is an integer selected from a range of 2 or more and 5 or less.)

$$CH_3(CH_2)_nCH=CH(CH_2)_mCOOH \qquad <3>$$

(Provided that in the general formula <1>, n+m is an integer selected from a range of 12 or more and 20 or less.)

$$CH_3(CH_2)_pCOO-(CH_2)_qCH(CH_3)_2 \qquad <4>$$

(Provided that in the general formula <2>, p is an integer selected from a range of 14 or more and 22 or less, and q is an integer selected from a range of 1 or more and 3 or less.)

(13)

The magnetic recording medium according to any one of (1) to (12) described above, in which the base layer has a large number of holes, and the holes of the magnetic layer are connected to the holes of the base layer.

(14)

The magnetic recording medium according to any one of (1) to (13) described above, in which the surface of the magnetic layer has arithmetic average roughness Ra of 0.8 nm or more.

(15)

The magnetic recording medium according to any one of (1) to (14) described above, in which the entire magnetic recording medium has a BET specific surface area of 4.0 m$^2$/g or more in a state where the lubricant has been removed from the magnetic recording medium and the magnetic recording medium has been dried.

(16)

The magnetic recording medium according to any one of (1) to (15) described above, in which the entire magnetic recording medium has a BET specific surface area of 4.5 m$^2$/g or more in a state where the lubricant has been removed from the magnetic recording medium and the magnetic recording medium has been dried.

(17)

The magnetic recording medium according to any one of (1) to (16) described above, in which the entire magnetic recording medium has a BET specific surface area of 5.0 m$^2$/g or more in a state where the lubricant has been removed from the magnetic recording medium and the magnetic recording medium has been dried.

(18)

The magnetic recording medium according to any one of (1) to (17) described above, in which the entire magnetic recording medium has a BET specific surface area of 7.0 m$^2$/g or less in a state where the lubricant has been removed from the magnetic recording medium and the magnetic recording medium has been dried.

(19)

The magnetic recording medium according to any one of (1) to (18) described above, in which the entire magnetic recording medium has a BET specific surface area of 6.0 m$^2$/g or less in a state where the lubricant has been removed from the magnetic recording medium and the magnetic recording medium has been dried.

(20)

The magnetic recording medium according to any one of (1) to (19) described above, in which the entire magnetic recording medium has a BET specific surface area of 5.5 m$^2$/g or less in a state where the lubricant has been removed from the magnetic recording medium and the magnetic recording medium has been dried.

(21)

A magnetic recording/reproducing device including:

a feeding unit that can sequentially feed out a tape-shaped magnetic recording medium;

a winding unit that can wind up the magnetic recording medium fed out from the feeding unit; and a magnetic head that can write information on the magnetic recording medium and can read out information from the magnetic recording medium while being in contact with the magnetic recording medium traveling from the feeding unit toward the winding unit, in which the magnetic recording medium includes:

a substrate;

a base layer disposed on the substrate; and a magnetic layer disposed on the base layer, the substrate includes a polyester as a main component, the base layer has an average thickness of 0.9 µm or less, the base layer and the magnetic layer each include a lubricant, the magnetic layer has a surface having a large number of holes, and the surface has arithmetic average roughness Ra of 2.5 nm or less, the entire magnetic recording medium has a BET specific surface area of 3.5 m$^2$/g or more in a state where the lubricant has been removed from the magnetic recording medium and the magnetic recording medium has been dried, a squareness ratio in a perpendicular direction is 65% or more, the magnetic layer has an average thickness of 90 nm or less, and the magnetic recording medium has an average thickness of 5.6 µm or less.

(22)

The magnetic recording/reproducing device according to (21) described above, in which a tension applied to the magnetic recording medium in a longitudinal direction thereof can be adjusted.

(23)

A magnetic recording medium cartridge including:

the tape-shaped magnetic recording medium according to any one of (1) to (22) described above; and a casing that houses the magnetic recording medium.

This application claims the benefit of priority based on Japanese Patent Application No. 2019-149511 filed on Aug. 16, 2019, the entire contents of which are incorporated herein by reference.

A person skilled in the art can conceive of various modifications, combinations, sub-combinations, and changes, in accordance with design requirements and other factors. It is understood that these modifications, combinations, sub-combinations, and changes are included in the appended claims and the scope of equivalents thereof.

The invention claimed is:

1. A magnetic recording medium comprising:

a substrate;

a base layer disposed on the substrate; and a magnetic layer disposed on the base layer, wherein the substrate includes a polyester as a main component, the base layer has an average thickness of 0.9 µm or less, the magnetic recording medium includes a lubricant, the magnetic layer has a surface having a plurality of holes, and the surface has an arithmetic average roughness Ra of 2.5 nm or less, the magnetic recording medium has a BET specific surface area of 3.5 m$^2$/g or more in a state where the lubricant has been removed from the magnetic recording medium and the magnetic recording medium has been dried, a squareness ratio in a longitudinal direction is 35% or less, the magnetic layer has an average thickness of 90 nm or less, and the magnetic recording medium has an average thickness of 5.6 µm or less.

2. The magnetic recording medium according to claim 1, wherein the magnetic layer has a data track width of 1.5 µm or less, the magnetic layer includes a magnetic powder, and the magnetic powder has an average aspect ratio of 1.1 or more and 3.0 or less.

3. The magnetic recording medium according to claim 1, wherein the magnetic recording medium has an average thickness of 5.2 μm or less.

4. The magnetic recording medium according to claim 1, wherein
the magnetic recording medium has a Young's modulus of 7.78 σPa or less.

5. The magnetic recording medium according to claim 1, wherein
the substrate has an average thickness of 4.2 μm or less.

6. The magnetic recording medium according to claim 1, further comprising
a back layer disposed on a side of the substrate opposite to the base layer, wherein
the back layer has an average thickness of 0.3 μm or more and 0.5 μm or less.

7. The magnetic recording medium according to claim 1, wherein
the base layer has an average thickness of 0.5 μm or more.

8. The magnetic recording medium according to claim 1, wherein
the magnetic recording medium has an average pore diameter of 6 nm or more and 12 nm or less, the average pore diameter being determined by a BJH method.

9. The magnetic recording medium according to claim 1, wherein
in a case where a coefficient of dynamic friction between the surface and a magnetic head is represented by $\mu_A$ when a tension of 0.4 N is applied to the magnetic recording medium, and a coefficient of dynamic friction between the surface and the magnetic head is represented by $\mu_B$ when a tension of 1.2 N is applied to the magnetic recording medium, a friction coefficient ratio $\mu_B/\mu_A$ is 1.0 or more and 1.8 or less.

10. The magnetic recording medium according to claim 1, wherein
in a case where a fifth coefficient of dynamic friction between the surface and a magnetic head from the start of travel of the magnetic recording medium is represented by μC(5) when a tension of 0.6 N is applied to the magnetic recording medium, and a 1000th coefficient of dynamic friction between the surface and the magnetic head from the start of travel of the magnetic recording medium is represented by μC(1000) when a tension of 0.6 N is applied to the magnetic recording medium, a friction coefficient ratio μC(1000)/μC(5) is 1.2 or more and 1.8 or less.

11. The magnetic recording medium according to claim 1, wherein
the magnetic layer includes a magnetic powder, and
the magnetic powder has an average aspect ratio of 1.1 or more and 3.0 or less.

12. The magnetic recording medium according to claim 1, wherein
the magnetic layer includes a magnetic powder, and
the magnetic powder includes hexagonal ferrite including at least one of barium (Ba) and strontium (Sr), ε iron oxide, or cobalt (Co)-containing spinel type ferrite.

13. The magnetic recording medium according to claim 1, wherein
the magnetic layer includes a magnetic powder, and
the magnetic powder has an average particle size of 25 nm or less.

14. The magnetic recording medium according to claim 1, wherein
the lubricant includes at least one of compounds represented by a following general formulas <1> to <4>:

$$CH_3(CH_2)_nCOOH \qquad <1>$$

wherein in the general formula <1>, n is an integer selected from a range of 14 or more and 22 or less;

$$CH_3(CH_2)_pCOO(CH_2)_qCH_3 \qquad <2>$$

wherein in the general formula <2>, p is an integer selected from a range of 14 or more and 22 or less, and q is an integer selected from a range of 2 or more and 5 or less;

$$CH_3(CH_2)_nCH=CH(CH_2)_mCOOH \qquad <3>$$

wherein in the general formula <3>, n+m is an integer selected from a range of 12 or more and 20 or less; and $$CH_3(CH_2)_pCOO-(CH_2)_qCH(CH_3)_2 \qquad <4>$$

wherein in the general formula <4>, p is an integer selected from a range of 14 or more and 22 or less, and q is an integer selected from a range of 1 or more and 3 or less.

15. The magnetic recording medium according to claim 1, wherein
the base layer has a plurality of holes, and
the holes of the magnetic layer are connected to the holes of the base layer.

16. The magnetic recording medium according to claim 1, wherein
the arithmetic average roughness Ra of the magnetic layer ranges from 0.8 nm to 2.5 nm.

17. The magnetic recording medium according to claim 1, wherein the BET specific surface area of the magnetic recording medium is 4.0 m²/g or more.

18. The magnetic recording medium according to claim 1, wherein the BET specific surface area of the magnetic recording medium is 4.5 m²/g or more.

19. The magnetic recording medium according to claim 1, wherein the BET specific surface area of the magnetic recording medium is 5.0 m²/g or more.

20. The magnetic recording medium according to claim 1, wherein
the BET specific surface area of the magnetic recording medium ranges from 3.5 m²/g to 7.0 m²/g.

21. The magnetic recording medium according to claim 1, wherein the BET specific surface area of the magnetic recording medium ranges from 3.5 m²/g to 6.0 m²/g.

22. The magnetic recording medium according to claim 1, wherein the BET specific surface area of the magnetic recording medium ranges from 3.5 m²/g to 5.5 m²/g.

23. The magnetic recording medium according to claim 1, wherein the arithmetic average roughness Ra is 2.2 nm or less.

24. The magnetic recording medium according to claim 1, wherein a coercive force Hc of the magnetic recording medium is 2000 Oe or less.

25. The magnetic recording medium according to claim 1, the magnetic layer includes a magnetic powder, and wherein an average particle volume of the magnetic powder is 1000 nm³ or more and 2500 nm³ or less.

26. A magnetic recording/reproducing device comprising:
a feeding unit that can sequentially feed out a magnetic recording medium;
a winding unit that can wind up the magnetic recording medium fed out from the feeding unit; and
a magnetic head that can write information on the magnetic recording medium and can read out information from the magnetic recording medium while being in contact with the magnetic recording medium traveling from the feeding unit toward the winding unit, wherein
the magnetic recording medium includes:
  a substrate;
  a base layer disposed on the substrate; and
  a magnetic layer disposed on the base layer, wherein
  the substrate includes a polyester as a main component,
  the base layer has an average thickness of 0.9 μm or less,
  the magnetic recording medium includes a lubricant,
  the magnetic layer has a surface having a plurality of holes, and the surface has an arithmetic average roughness Ra of 2.5 nm or less,
  the magnetic recording medium has a BET specific surface area of 3.5 m$^2$/g or more in a state where the lubricant has been removed from the magnetic recording medium and the magnetic recording medium has been dried,
  a squareness ratio in a longitudinal direction is 35% or less,
  the magnetic layer has an average thickness of 90 nm or less, and
  the magnetic recording medium has an average thickness of 5.6 μm or less.

27. A magnetic recording medium cartridge comprising:
a magnetic recording medium; and
a casing that houses the magnetic recording medium, wherein
the magnetic recording medium includes:
  a substrate;
  a base layer disposed on the substrate; and
  a magnetic layer disposed on the base layer, wherein
  the substrate includes a polyester as a main component,
  the base layer has an average thickness of 0.9 μm or less, the magnetic recording medium includes a lubricant,
  the magnetic layer has a surface having a plurality of holes, and the surface has an arithmetic average roughness Ra of 2.5 nm or less,
  the magnetic recording medium has a BET specific surface area of 3.5 m$^2$/g or more in a state where the lubricant has been removed from the magnetic recording medium and the magnetic recording medium has been dried,
  a squareness ratio in a longitudinal direction is 35% or less,
  the magnetic layer has an average thickness of 90 nm or less, and
  the magnetic recording medium has an average thickness of 5.6 μm or less.

* * * * *